US012717156B2

(12) United States Patent
Park et al.

(10) Patent No.: US 12,717,156 B2
(45) Date of Patent: Aug. 25, 2026

(54) LENS MOVING APPARATUS

(71) Applicant: LG INNOTEK CO., LTD., Seoul (KR)

(72) Inventors: Sang Ok Park, Seoul (KR); Seong Min Lee, Seoul (KR); Jun Taek Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 1006 days.

(21) Appl. No.: 17/818,190

(22) Filed: Aug. 8, 2022

(65) Prior Publication Data

US 2022/0382071 A1 Dec. 1, 2022

Related U.S. Application Data

(63) Continuation of application No. 16/683,762, filed on Nov. 14, 2019, now Pat. No. 11,442,286, which is a (Continued)

(30) Foreign Application Priority Data

Jul. 24, 2014 (KR) ........................ 10-2014-0093861
Jul. 24, 2014 (KR) ........................ 10-2014-0093934

(51) Int. Cl.
*G02B 27/64* (2006.01)
*G02B 7/08* (2021.01)

(52) U.S. Cl.
CPC ............. *G02B 27/646* (2013.01); *G02B 7/08* (2013.01)

(58) Field of Classification Search
CPC .... G02B 27/646; G02B 7/09; H02K 2213/03; H02K 33/18; H04M 1/0264
See application file for complete search history.

(56) References Cited

U.S. PATENT DOCUMENTS 5,220,461 A 6/1993 Inoue et al.
8,638,510 B2 1/2014 Lee et al.
(Continued)

FOREIGN PATENT DOCUMENTS

CN 1094820 A 11/1994
CN 1710647 A 12/2005
(Continued)

OTHER PUBLICATIONS

European Search Report dated Nov. 19, 2015 in European Application No. 15178085.5.

(Continued)

*Primary Examiner* — Brandi N Thomas
(74) *Attorney, Agent, or Firm* — SALIWANCHIK, LLOYD & EISENSCHENK

(57) ABSTRACT

Embodiments provide a lens moving apparatus including a housing for supporting a first magnet, a bobbin including a coil disposed on an outer surface thereof and inside the first magnet so as to move in the housing in a first direction parallel to an optical axis by electromagnetic interaction between the first magnet and the coil, and upper and lower elastic members, each of which is provided at the bobbin and the housing and includes an inner frame coupled to the bobbin and an outer frame coupled to the housing, wherein at least one of the upper and lower elastic members is constituted by a printed circuit board.

19 Claims, 31 Drawing Sheets

Related U.S. Application Data continuation of application No. 16/244,728, filed on Jan. 10, 2019, now Pat. No. 10,564,443, which is a continuation of application No. 15/991,803, filed on May 29, 2018, now Pat. No. 10,216,003, which is a continuation of application No. 15/704,892, filed on Sep. 14, 2017, now Pat. No. 10,007,126, which is a continuation of application No. 14/803,697, filed on Jul. 20, 2015, now Pat. No. 9,791,713.

(56) References Cited

U.S. PATENT DOCUMENTS

| | | | |
|---|---|---|---|
| 8,698,952 | B2 | 4/2014 | Oh |
| 8,817,116 | B2 | 8/2014 | Kim et al. |
| 8,836,177 | B2 | 9/2014 | Lee et al. |
| 8,912,690 | B2 | 12/2014 | Kim et al. |
| 8,947,545 | B2 | 2/2015 | Han |
| 9,035,502 | B2 | 5/2015 | Park |
| 9,083,874 | B2 | 7/2015 | Lee et al. |
| 9,190,891 | B2 | 11/2015 | Lee et al. |
| 9,197,121 | B2 | 11/2015 | Lee et al. |
| 9,264,618 | B2 | 2/2016 | Kim |
| 9,282,247 | B2 | 3/2016 | Park |
| 9,300,196 | B2 | 3/2016 | Han |
| 9,341,810 | B2 | 5/2016 | Park et al. |
| 9,360,653 | B2 | 6/2016 | Lee et al. |
| 9,420,184 | B2 | 8/2016 | Ahn |
| 9,423,628 | B2 | 8/2016 | Han |
| 9,423,631 | B2 | 8/2016 | Cho et al. |
| 9,438,093 | B2 | 9/2016 | Kim et al. |
| 9,451,167 | B2 | 9/2016 | Lee |
| 9,485,396 | B2 | 11/2016 | Oh |
| 9,515,542 | B2 | 12/2016 | Kim et al. |
| 9,554,023 | B2 | 1/2017 | Park |
| 9,575,283 | B2 | 2/2017 | Lee et al. |
| 9,575,329 | B2 | 2/2017 | Kim et al. |
| 9,578,244 | B2 | 2/2017 | Cho et al. |
| 9,591,191 | B2 | 3/2017 | Park et al. |
| 9,599,838 | B2 | 3/2017 | Park et al. |
| 9,621,017 | B2 | 4/2017 | Lee et al. |
| 9,690,070 | B2 | 6/2017 | Lee et al. |
| 9,723,185 | B2 | 8/2017 | Park |
| 9,726,850 | B2 | 8/2017 | Lee |
| 9,726,852 | B2 | 8/2017 | Cho et al. |
| 9,729,793 | B2 | 8/2017 | Kim |
| 9,736,377 | B2 | 8/2017 | Lee |
| 9,740,020 | B2 | 8/2017 | Park et al. |
| 9,781,322 | B2 | 10/2017 | Cho et al. |
| 9,791,713 | B2 | 10/2017 | Park et al. |
| 9,854,144 | B2 | 12/2017 | Park et al. |
| 9,857,555 | B2 | 1/2018 | Lee et al. |
| 9,885,849 | B2 | 2/2018 | Cho et al. |
| 9,917,997 | B2 | 3/2018 | Cho et al. |
| 9,921,388 | B2 | 3/2018 | Park et al. |
| 9,946,049 | B2 | 4/2018 | Kim et al. |
| 9,955,086 | B2 | 4/2018 | Park |
| 9,964,775 | B2 | 5/2018 | Yeo |
| 9,977,255 | B2 | 5/2018 | Park et al. |
| 9,979,888 | B2 | 5/2018 | Jung et al. |
| 9,989,727 | B2 | 6/2018 | Shin et al. |
| 10,001,658 | B2 | 6/2018 | Park et al. |
| 10,007,126 | B2 | 6/2018 | Park et al. |
| 10,038,832 | B2 | 7/2018 | Park et al. |
| 10,042,140 | B2 | 8/2018 | Park |
| 10,042,178 | B2 | 8/2018 | Park et al. |
| 10,057,493 | B2 | 8/2018 | Park et al. |
| 10,088,645 | B2 | 10/2018 | Park et al. |
| 10,095,047 | B2 | 10/2018 | Min et al. |
| 10,114,229 | B2 | 10/2018 | Jung et al. |
| 10,116,849 | B2 | 10/2018 | Park |
| 10,122,938 | B2 | 11/2018 | Park |
| 10,133,087 | B2 | 11/2018 | Park et al. |
| 10,164,499 | B2 | 12/2018 | Kim et al. |
| 10,197,813 | B2 | 2/2019 | Lee et al. |
| 10,216,000 | B2 | 2/2019 | Park et al. |
| 10,216,003 | B2 | 2/2019 | Park et al. |
| 10,247,904 | B2 | 4/2019 | Kim et al. |
| 10,264,182 | B2 | 4/2019 | Park et al. |
| 10,281,737 | B2 | 5/2019 | Park et al. |
| 10,284,787 | B2 | 5/2019 | Park |
| 10,291,832 | B2 | 5/2019 | Lee et al. |
| 10,295,781 | B2 | 5/2019 | Park et al. |
| 10,338,404 | B2 | 7/2019 | Park et al. |
| 10,367,982 | B2 | 7/2019 | Cho et al. |
| 2007/0065131 | A1 | 3/2007 | Wei et al. |
| 2008/0158412 | A1 | 7/2008 | Tagome et al. |
| 2008/0297650 | A1 | 12/2008 | Son |
| 2009/0015948 | A1 | 1/2009 | Wada et al. |
| 2009/0252488 | A1 | 10/2009 | Eromaki et al. |
| 2011/0044679 | A1 | 2/2011 | Yoshida et al. |
| 2011/0096178 | A1 | 4/2011 | Ryu et al. |
| 2012/0008220 | A1 | 1/2012 | Lee et al. |
| 2012/0008221 | A1 | 1/2012 | Min et al. |
| 2012/0013202 | A1 | 1/2012 | Lee |
| 2012/0025633 | A1 | 2/2012 | Lee et al. |
| 2012/0092768 | A1 | 4/2012 | Shiraki et al. |
| 2012/0120512 | A1* | 5/2012 | Wade .................... G02B 7/08 359/824 |
| 2012/0314307 | A1 | 12/2012 | Ikushima et al. |
| 2013/0083409 | A1 | 4/2013 | Lee |
| 2013/0088607 | A1 | 4/2013 | Akutsu et al. |
| 2013/0135762 | A1 | 5/2013 | Lee et al. |
| 2013/0194491 | A1 | 8/2013 | Kudo |
| 2013/0250170 | A1 | 9/2013 | Oh |
| 2014/0072289 | A1 | 3/2014 | Lim et al. |
| 2014/0118854 | A1 | 5/2014 | Kirii |
| 2018/0124222 | A1 | 5/2018 | Hosoi et al. |

FOREIGN PATENT DOCUMENTS

| | | | | |
|---|---|---|---|---|
| CN | 1790084 | A | 6/2006 | |
| CN | 101216589 | A | 7/2008 | |
| CN | 101221276 | A | 7/2008 | |
| CN | 101408657 | A | 4/2009 | |
| CN | 201233465 | Y | 5/2009 | |
| CN | 101526663 | A | 9/2009 | |
| CN | 101604063 | A | 12/2009 | |
| CN | 101630889 | A | 1/2010 | |
| CN | 101990755 | A | 3/2011 | |
| CN | 102075056 | A | 5/2011 | |
| CN | 102135656 | A | 7/2011 | |
| CN | 102162896 | A | 8/2011 | |
| CN | 102162897 | A | 8/2011 | |
| CN | 102214982 | A | 10/2011 | |
| CN | 102314048 | A | 1/2012 | |
| CN | 102480588 | A | 5/2012 | |
| CN | 102540637 | A | 7/2012 | |
| CN | 202512286 | U | 10/2012 | |
| CN | 102879972 | A | 1/2013 | |
| CN | 202794665 | U | 3/2013 | |
| CN | 103529536 | A | 1/2014 | |
| CN | 103649827 | A | 3/2014 | |
| CN | 103676402 | A | 3/2014 | |
| CN | 103713373 | A | 4/2014 | |
| CN | 103792758 | A | 5/2014 | |
| CN | 104142553 | * | 11/2014 | .......... G02B 27/646 |
| JP | 2006-243320 | | 9/2006 | |
| JP | 2006-293244 | A | 10/2006 | |
| JP | 2008-139811 | A | 6/2008 | |
| JP | 2009-265210 | A | 11/2009 | |
| JP | 2012-177753 | A | 9/2012 | |
| KR | 10-2008-0105396 | A | 12/2008 | |
| KR | 10-2010-0048361 | A | 5/2010 | |
| KR | 10-2010-0048362 | A | 5/2010 | |
| KR | 10-2011-0088402 | A | 8/2011 | |
| TW | 200944930 | A | 11/2009 | |
| WO | 2014/010865 | A1 | 1/2014 | |

OTHER PUBLICATIONS

Notice of Allowance dated Oct. 10, 2018 in U.S. Appl. No. 15/991,803.

(56) References Cited

OTHER PUBLICATIONS

Chinese Office Action issued on Oct. 12, 2018 in Application No. 201510441027.9.
Notice of Allowance dated Aug. 7, 2019 in U.S. Appl. No. 16/244,728.
Examination Report dated Oct. 17, 2019 in European Application No. 15 178 085.5.
Office Action dated Nov. 9, 2020 in Korean Application No. 10-2014-0093861.
Office Action dated Nov. 9, 2020 in Korean Application No. 10-2014-0093934.
Office Action dated Jan. 5, 2022 in Chinese Application No. 202010997130.2.
Office Action dated Jan. 26, 2022 in Chinese Application No. 202010997118.1.
Notice of Allowance dated May 10, 2022 in U.S. Appl. No. 16/683,762.
Office Action dated Dec. 8, 2021 in U.S. Appl. No. 16/683,762.
Notice of Allowance dated Feb. 27, 2018 in U.S. Appl. No. 15/704,892.
Office Action dated Aug. 18, 2016 in U.S. Appl. No. 14/803,697.
Office Action dated Mar. 8, 2017 in U.S. Appl. No. 14/803,697.
Notice of Allowance dated Jun. 12, 2017 in U.S. Appl. No. 14/803,697.
Notice of Grant dated May 31, 2023 in Chinese Application No. 202010997130.2.
European Search Report dated Jun. 7, 2023 in European Application No. 23162075.8.
Office Action dated Apr. 22, 2023 in Chinese Application No. 202010997118.1.

* cited by examiner

LENS MOVING APPARATUS

CROSS-REFERENCE TO RELATED APPLICATIONS

This application is a continuation of U.S. application Ser. No. 16/683,762, filed Nov. 14, 2019; which is a continuation of U.S. application Ser. No. 16/244,728, filed Jan. 10, 2019, now U.S. Pat. No. 10,564,443, issued Feb. 18, 2020; which is a continuation of U.S. application Ser. No. 15/991,803, filed May 29, 2018, now U.S. Pat. No. 10,216,003, issued Feb. 26, 2019; which is a continuation of U.S. application Ser. No. 15/704,892, filed Sep. 14, 2017, now U.S. Pat. No. 10,007,126, issued Jun. 26, 2018; which is a continuation of U.S. application Ser. No. 14/803,697, filed Jul. 20, 2015, now U.S. Pat. No. 9,791,713, issued Oct. 17, 2017; which claims the benefit under 35 U.S.C. § 119 of Korean Patent Application Nos. 10-2014-0093861 and 10-2014-0093934, both filed Jul. 24, 2014, which are herein incorporated by reference in their entirety.

TECHNICAL FIELD

Embodiments relate to a lens moving apparatus.

BACKGROUND

In recent years, IT products equipped with subminiature digital cameras such as, for example, cellular phones, smartphones, tablet PCs, and notebook computers, have actively been developed.

IT products equipped with conventional subminiature digital cameras incorporate a lens moving apparatus for aligning the focal distance of a lens by adjusting the distance between the lens and an image sensor, which converts outside light into a digital image.

A lens moving apparatus includes an upper elastic member and a lower elastic member. Each of the upper and lower elastic member may include an inner frame coupled to a bobbin, an outer frame coupled to a housing, and a connection portion connecting the outer frame and the inner frame.

The connection portion may be bent at least one time to form a predetermined pattern. Upward and/or downward movement in a first direction, that is, in the direction of the optical axis of the bobbin, may be flexibly supported by positional change and fine deformation of the connection portion.

However, such a conventional lens moving apparatus has drawbacks as follows:

When the connection portion is configured to have a specific pattern having a plurality of bent portions, the plurality of bent portions may vibrate at a specific frequency at the time of vibration of the connection portion, and thus there may be the generation of noise and an oscillation phenomenon.

BRIEF SUMMARY

Embodiments provide a lens moving apparatus which is designed to reduce noise and to eliminate an oscillation phenomenon at the time of driving of a motor.

In one embodiment, a lens moving apparatus includes a housing for supporting a first magnet, a bobbin including a coil disposed on an outer surface thereof and inside the first magnet so as to move in the housing in a first direction parallel to an optical axis by electromagnetic interaction between the first magnet and the coil, and upper and lower elastic members, each of which is provided at the bobbin and the housing and includes an inner frame coupled to the bobbin and an outer frame coupled to the housing, wherein at least one of the upper and lower elastic members is constituted by a printed circuit board.

The printed circuit board may be disposed on an inner surface of the housing and extend therefrom, and may be provided with a position sensor at the region thereof extending from the inner surface of the housing.

At least one of the upper and lower elastic members may be made of polyimide or polyamide.

The printed circuit board may include a conductive layer disposed in the polyimide or polyamide.

The printed circuit board may be integrally formed with the upper elastic member.

The inner frame and the outer frame of each of the upper and lower elastic members may be connected to each other through a connection portion, and at least one of the connection portions of the upper and lower elastic members may have an irregular width.

At least one of the connection portions of the upper and lower elastic members may include a first region and a second region which have widths different from each other.

At least one of the connection portions of the upper and lower elastic members may be bent at least one time to form a predetermined pattern.

The lens moving apparatus may further include a damper connecting the housing and the connection portion.

The damper may include silicone.

At least one of the connection portions of the upper and lower elastic members may be bent at least one time to form a predetermined pattern, and the damper may be disposed on at least a portion of the pattern of the connection portion.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
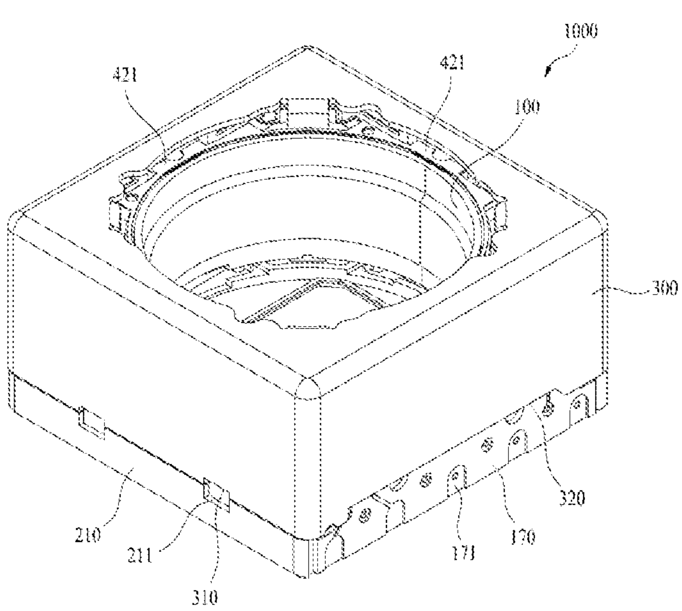
FIG. 1 is a schematic perspective view of a first embodiment of the lens moving apparatus.

Hereinafter, embodiments will be described with reference to the attached drawings. In the drawings, the same or similar elements are denoted by the same reference numerals even when they are depicted in different drawings. In the following description, a detailed description of known functions and configurations incorporated herein will be omitted when it may make the subject matter of the disclosure rather unclear. Those skilled in the art will appreciate that some features in the drawings are exaggerated, reduced, or simplified for ease in description, and drawings and elements thereof are not shown always at the proper scale.

For reference, in the respective drawings, a rectangular coordinate system (x, y, z) may be used. In the drawings, the x-axis and the y-axis indicate a plane perpendicular to the optical axis, and for convenience, the optical axis (z-axis) direction may be referred to as a first direction, the x-axis direction may be referred to as a second direction, and the y-axis direction may be referred to as a third direction.

In the following description, the terms “inner”, “inward” or “inner part” may refer to a direction toward the center of a lens moving apparatus or a part that is disposed relatively near the center as viewed from the plan view of the lens moving apparatus, and the terms “outer”, “outward” and “outer part” may refer to a direction away from the center of a lens moving apparatus or a part that is disposed relatively far from the center as viewed from the plan view of the lens moving apparatus.

Figure 2:
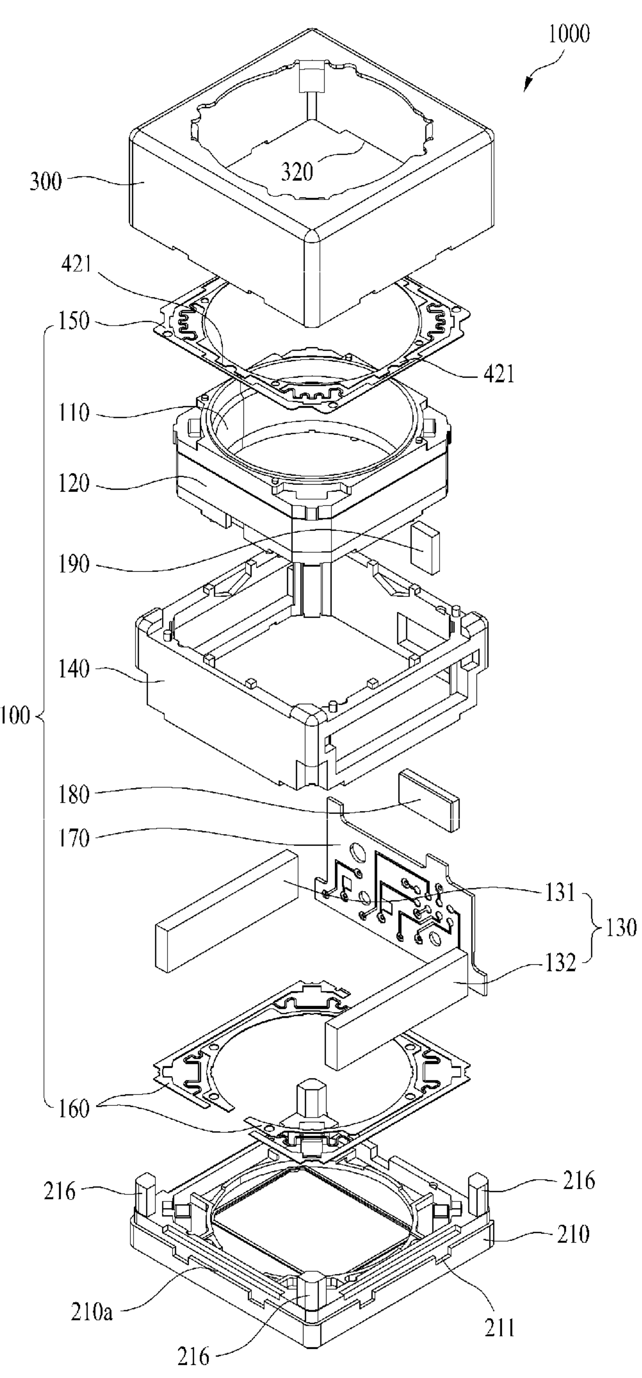
FIG. 2 is an exploded perspective view of the lens moving apparatus shown in FIG. 1.
Figure 3:
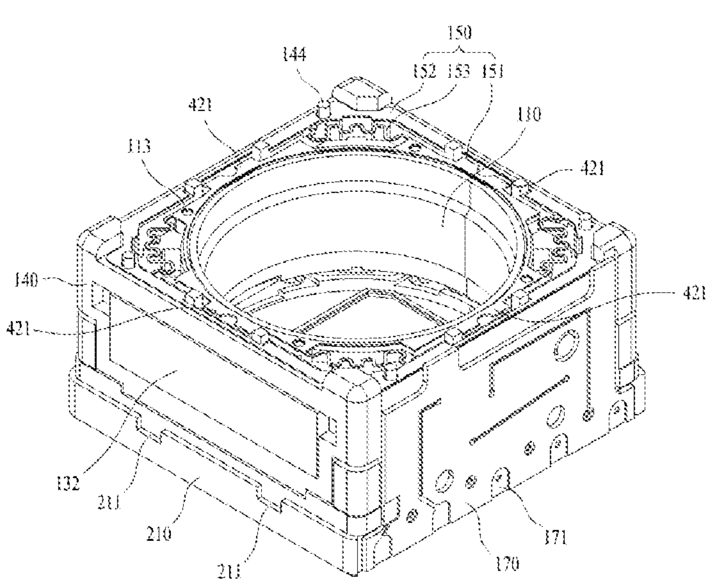
FIG. 3 is a schematic perspective view of the lens moving apparatus shown in FIG. 1 from which a cover member is removed.
Figure 4:
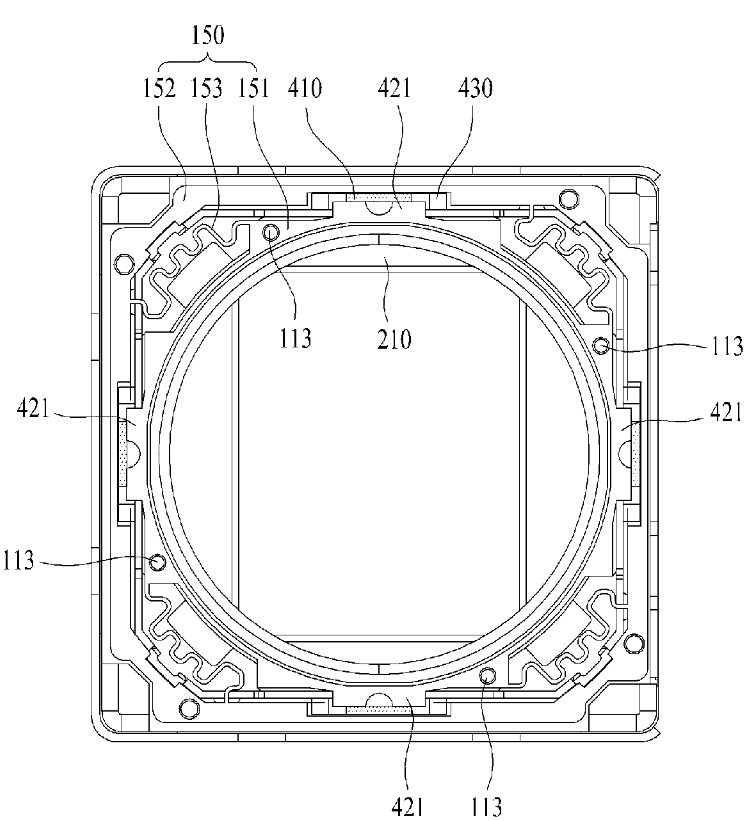
FIG. 4 is a schematic plan view of FIG. 3.
Figure 5:
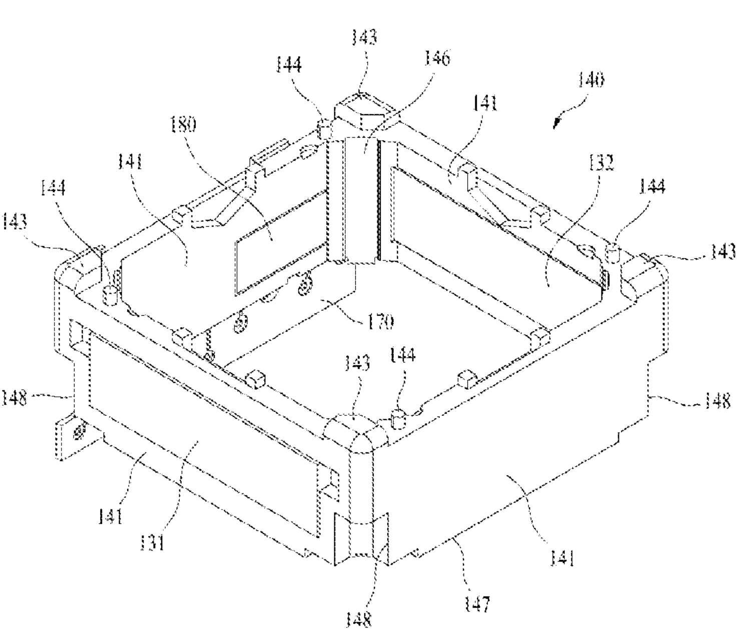
FIG. 5 is a schematic perspective view of a housing in the lens moving apparatus shown in FIG. 1.
Figure 6:
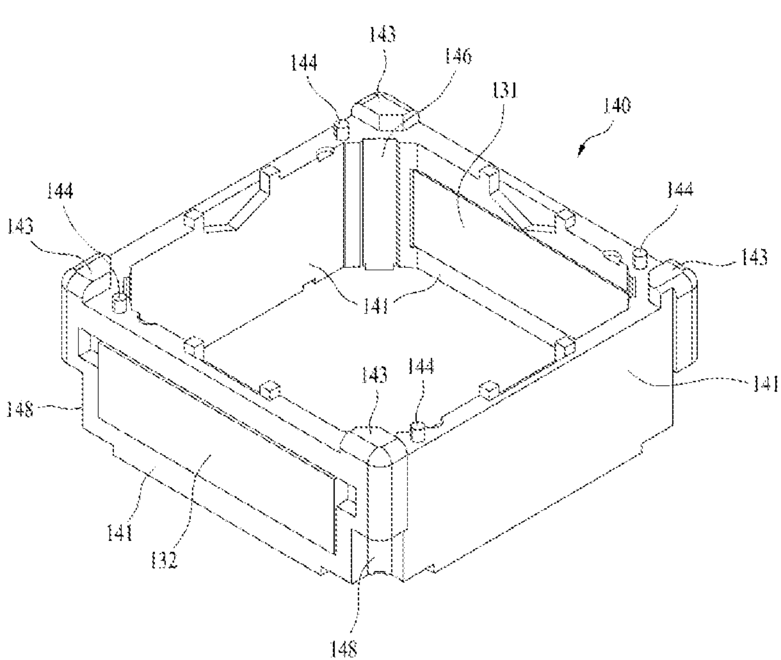
FIG. 6 is a schematic perspective view of the housing when viewed at an angle different from that in FIG. 5.
Figure 7:
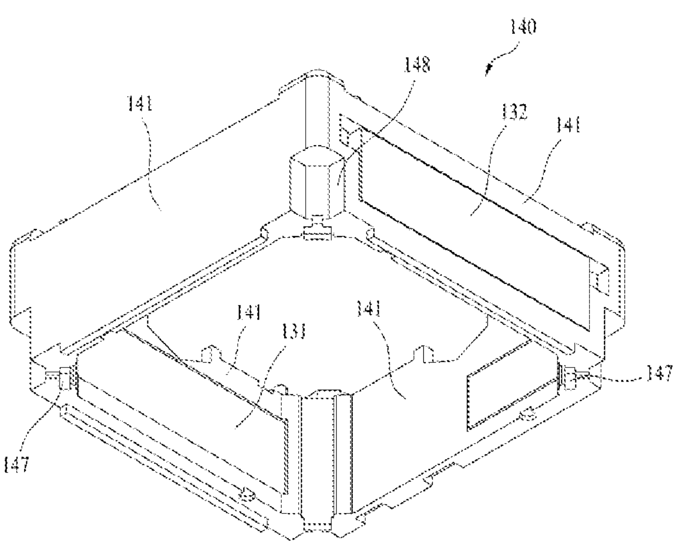
FIG. 7 is a schematic bottom perspective view of the housing in the lens moving apparatus shown in FIG. 1.
Figure 8:
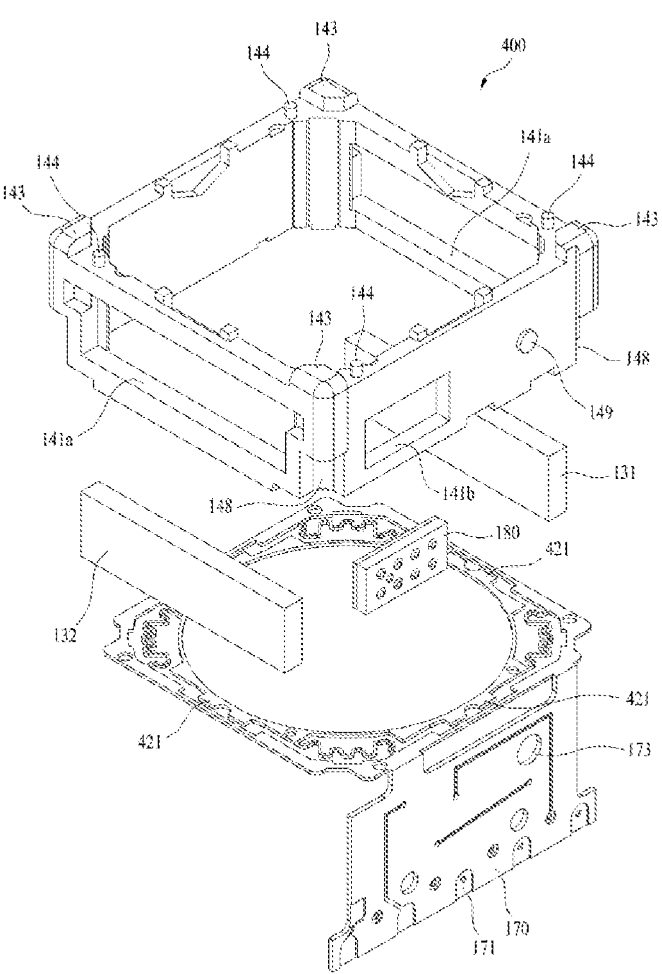
FIG. 8 is a schematic exploded perspective view of the housing in the lens moving apparatus shown in FIG. 1.
Figure 9A:
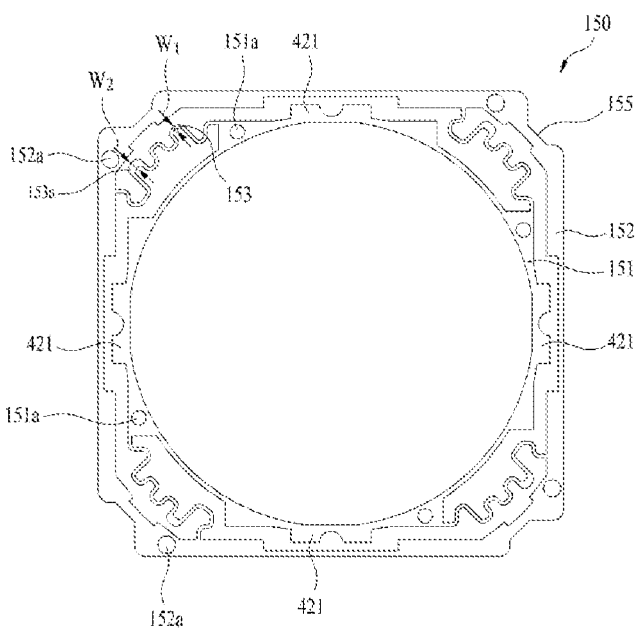
FIGS. 9A-9C are schematic plan views of an upper elastic member in the lens moving apparatus shown in FIG. 1.
Figure 9B:
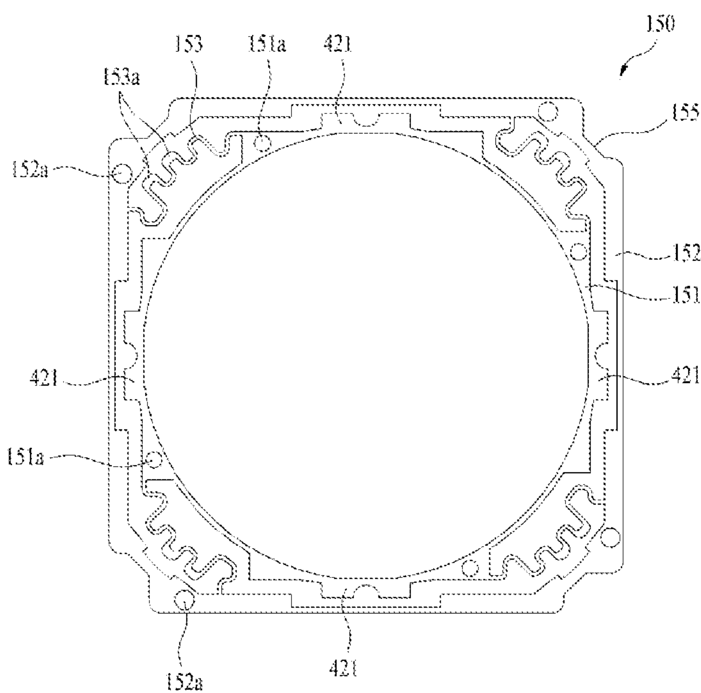
Figure 9C:
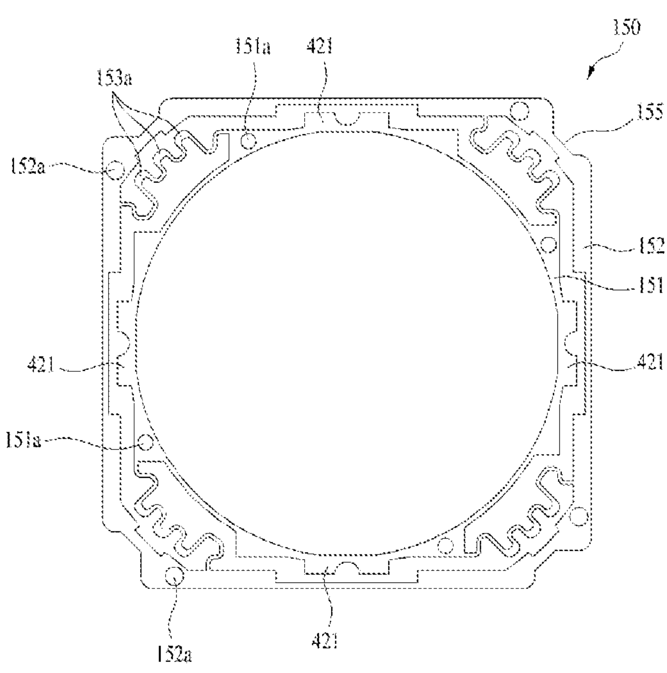
Figure 10A:
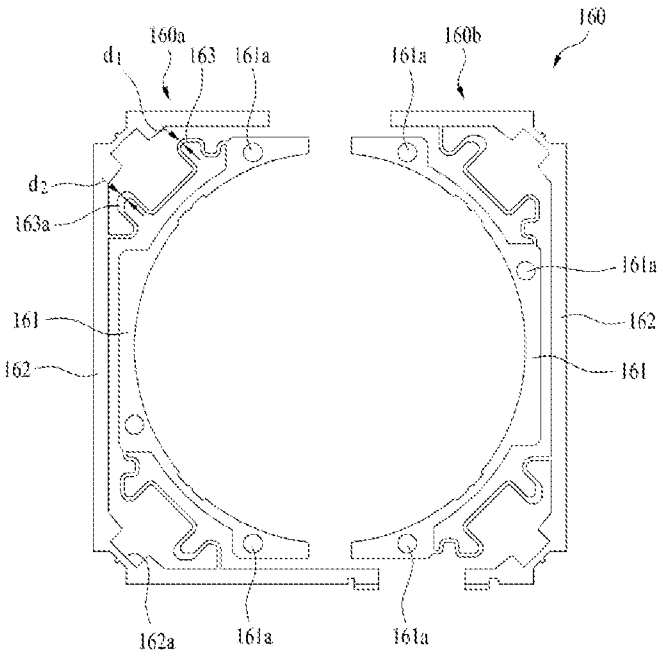
FIGS. 10A and 10B are schematic plan views of a lower elastic member in the lens moving apparatus shown in FIG. 1.
Figure 10B:
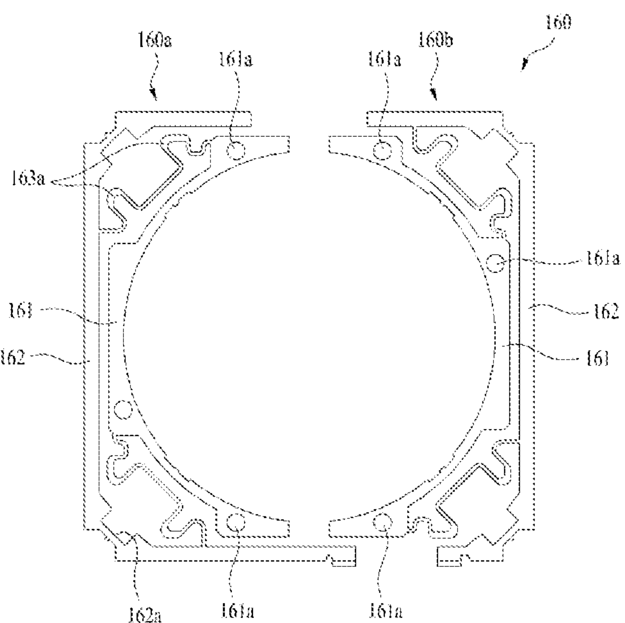
Figure 11A:
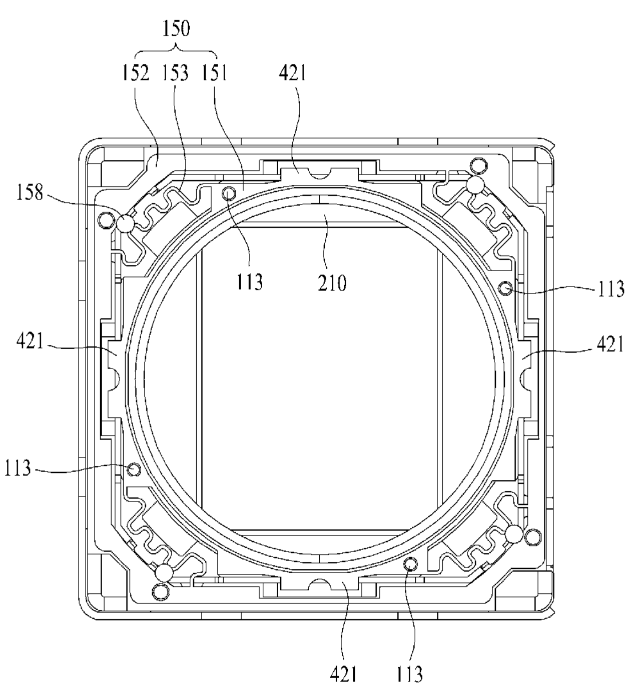
FIGS. 11A-11C are schematic views showing positions of dampers in the lens moving apparatus shown in FIG. 1.
Figure 11B:
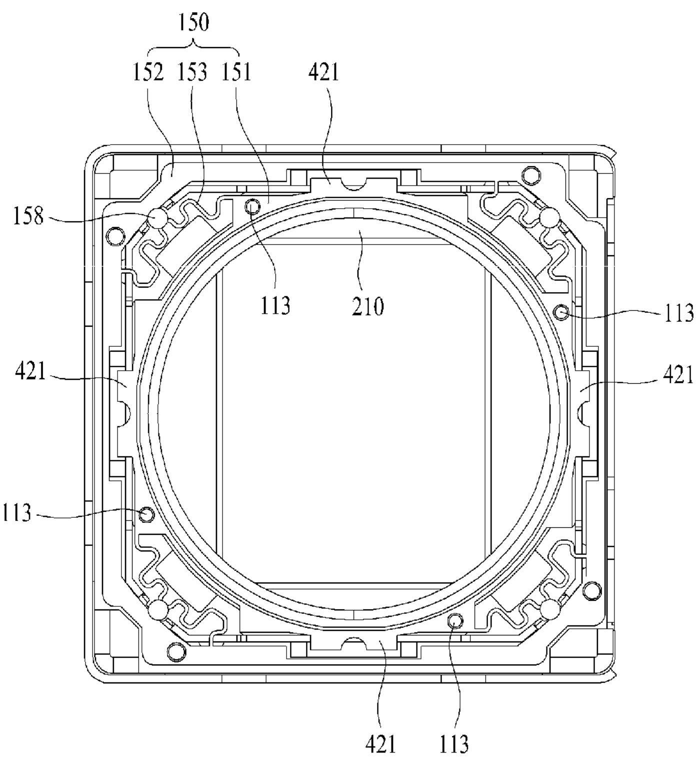
Figure 11C:
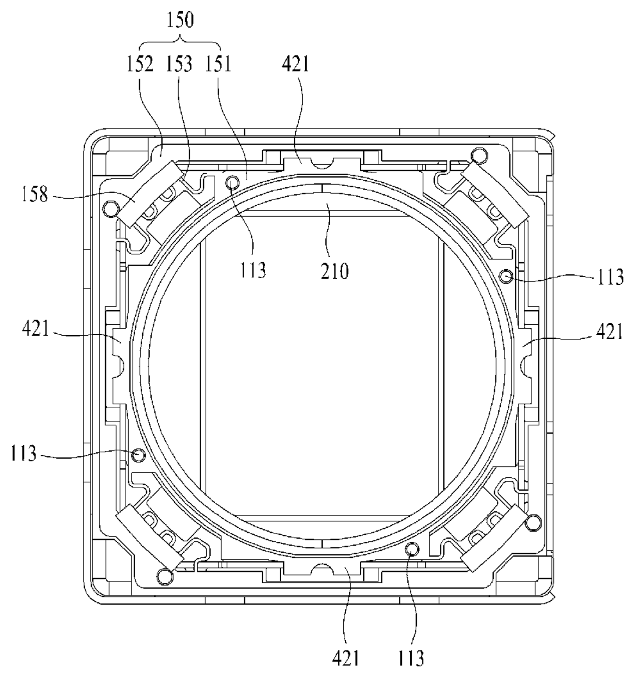

FIG. 1 is a schematic perspective view of a first embodiment of the lens moving apparatus. FIG. 2 is an exploded perspective view of the lens moving apparatus shown in FIG. 1. FIG. 3 is a schematic perspective view of the lens moving apparatus shown in FIG. 1 from which a cover member is removed. FIG. 4 is a schematic plan view of FIG. 3. FIG. 5 is a schematic perspective view of a housing in the lens moving apparatus shown in FIG. 1. FIG. 6 is a schematic perspective view of the housing when viewed at an angle different from that in FIG. 5. FIG. 7 is a schematic bottom perspective view of the housing in the lens moving apparatus shown in FIG. 1. FIG. 8 is a schematic exploded perspective view of the housing in the lens moving apparatus shown in FIG. 1. FIGS. 9A-9C are schematic plan views of an upper elastic member in the lens moving apparatus shown in FIG. 1. FIGS. 10A and 10B are schematic plan views of a lower elastic member in the lens moving apparatus shown in FIG. 1. FIGS. 11A-11C are schematic views showing positions of dampers in the lens moving apparatus shown in FIG. 1.

The lens moving apparatus according to this embodiment is designed to position an image sensor at the focal distance of a lens in a camera module by adjusting the distance between the lens and the image sensor. In other words, the lens moving apparatus serves to fulfill the autofocusing function.

As shown in FIGS. 1 to 4, the lens moving apparatus 1000 according to this embodiment may include a cover member 300, an upper elastic member 150, a bobbin 110, a coil 120 provided on the bobbin 110, a housing 140, a driving magnet 130 and a printed circuit board 170 which are provided at the housing 140, a lower elastic member 160, a displacement detection unit for determining an amount of displacement of a base 210 and the bobbin 110 in the optical axis direction (i.e. first direction), and a damping unit 410 serving as an attenuator.

The cover member 300 may be configured to have a box shape as a whole, and may be coupled to an upper surface of the base 210. The cover member 300 in conjunction with the base 210 may define an accommodation space which accommodates the upper elastic member 150, the bobbin 110, the coil 120 provided around the bobbin 110, the housing 140, the driving magnet 130 provided at the housing, and the printed circuit board 170.

The driving magnet 130 may be referred to as a first magnet, and a sensing magnet 190, which will be described later, may be referred to as a second magnet.

The cover member 300 may have an opening formed in an upper surface thereof in order to allow a lens coupled to the bobbin 110 to be exposed to external light. In addition, the opening may be provided with a window made of a light-transmissive material so as to block the filtration of dust, moisture and the like into the camera module.

The cover member 300 may include first cutout portions 310 formed in the lower end thereof. As described hereinafter, the base 210 may include second cutout portions 211 at positions at which the first cutout portions 310 are disposed (i.e. at positions corresponding to the first cutout portions 310) when the base 210 is coupled to the cover member 300. When the cover member 300 is coupled to the base 210, the combination of the first cutout portions 310 and the second cutout portions 211 may result in cutout holes each having a predetermined area. A viscous adhesive material may be applied to the cutout holes. More specifically, the adhesive material applied to the cutout holes fills the gap defined between the mating surfaces of the cover member 300 and the base 210. Consequently, when the cover member 300 is coupled to the base 210, the gap between the cover member 300 and the base 210 may be sealed by means of the adhesive material, and thus lateral side walls of the cover member 300 and the base 210 may be sealingly closed.

Furthermore, the cover member 300 may be provided with a third cutout portion 320 at an end surface thereof corresponding to the terminal surface of the printed circuit board 170 such that the end surface of the cover member 300 does not interfere with a plurality of terminals formed at the terminal surface of the printed circuit board 170. The third cutout portion 320 may be configured to be concave throughout the length of the surface thereof that faces the terminal surface of the printed circuit board 170. An adhesive material may be applied to the third cutout portion 320 to seal the clearance between the cover member 300, the base 210 and the printed circuit board 170. Thanks to the adhesive material, the lateral surfaces of the cover member 300 and the base 210 may also be sealingly closed when the cover member 300 is coupled to the base 210.

Although the first cutout portions 310 through the third cutout portion 320 are illustrated as being formed both at the cover member 300 and the base 210, they may be configured to have any of similar shapes, and may be formed only at one of the cover member 300 and the base 210 without limitation.

The base 210 may be configured to have a rectangular shape, and may define the accommodation space for the bobbin 110 and the housing 140 when being coupled to the cover member 300.

The base 210 may be provided at an outer and lower surface thereof with a shoulder protruding outward by a predetermined thickness. The thickness of the shoulder is the same as that of a side wall of the cover member 300. When the cover member 300 is coupled to the base 210, the side wall of the cover member 300 may be mounted on, may contact, may be disposed on or may be coupled to an upper portion or a side surface of the shoulder. Therefore, the shoulder may guide the cover member 300 coupled to the upper end thereof, and may contact the end of the cover member 300 in a surface contact manner. The end of the cover member may include a bottom surface or a side surface. The end of the shoulder and the end of the cover member 300 may be adhesively secured or sealed to each other by means of an adhesive or the like.

The second cutout portions 211 may be formed at the positions of the shoulder corresponding to the first cutout portions 310 of the cover member 300. As described above, the second cutout portions 211 define the cutout holes serving as adhesive spaces when being combined with the first cutout portions 310 of the cover member 300.

The base 210 may have an opening in the center thereof. The opening may be formed at a position corresponding to the image sensor provided in the camera module.

Furthermore, the base 210 may include four guide members 216 which vertically project upward from the four corners by a predetermined height. The guide members 216 may have a polygonal column shape. The guide members 216 may be fitted in, fastened to or coupled to lower guide grooves 148 in the housing 140 which will be described later. Thanks to the guide members 216 and the lower guide grooves 148, when the housing 140 is mounted or disposed on the base 210, it is possible to guide the coupling position of the housing 140 with respect to the base 210, and it is further possible to inhibit the housing 140 from being displaced from the reference mount position due to vibration during operation of the lens moving apparatus 100 or operator error during a coupling procedure.

As shown in FIGS. 4 to 8, the housing 140 may be configured to have a hollow column shape as a whole (for example, a hollow square column shape, as shown in the drawings). The housing 140 may be constructed to support the at least two driving magnets 130 and the printed circuit board 170, and may accommodate the bobbin 110 such that the bobbin 110 is movable with respect to the housing 140 in the first direction.

Although the upper elastic member 150 and the printed circuit board 170 are illustrated as being separated from each other in FIG. 2 for the convenience of understanding in FIG. 2, the upper elastic member 150 may be integrally formed with the printed circuit board 150, as shown in FIGS. 4 and 8.

The housing 140 may have four side flat surfaces. The side walls of the housing 140 may be sized to be equal to or larger than the driving magnet 130.

As shown in FIG. 8, two opposite side walls 141 of the four side walls 141 of the housing 140 may be provided with magnet mount holes or recesses 141*a* in which the driving magnets 130 are mounted or fitted. The magnet mount holes or recesses 141*a* may have a shape and size corresponding to the driving magnet 130, and may have a shape capable of guiding the driving magnets 130. The magnet mount holes 141*a* may be provided with a first driving magnet 131 and a second driving magnet 132, that is, two driving magnets 130.

One or two of the remaining two side walls, other than the opposite side walls of the four side walls 141 of the housing 140, may be provided with a sensor mount hole 141*b* into which a position sensor 180 (which will be described later) is fitted, disposed, fixed or mounted. When the printed circuit board 170 is disposed in the housing 140 such that the printed circuit board 170 extends from one side wall in an embodiment to be described hereinafter, the position sensor 180 may be disposed at the extending region. The sensor mount hole 141*b* may have a size and shape corresponding to those of the position sensor 180. Furthermore, the one side wall of the housing 400 may be provided with at least one mount protrusion 149 so as to enable the printed circuit board 170 to be mounted, disposed or temporarily secured thereto. The mount protrusion 149 is fitted in a mount hole 173 formed in the printed circuit board 170, which will be described later. The mount hole 173 and the mount protrusion 149 may be coupled to each other in a loose fitting manner or in an interference fitting manner, or they may provide only a relative guiding function.

Although the other side wall of the remaining two side walls 141 of the housing 140 may be configured to have a flat surface, the embodiment is not limited thereto.

In another embodiment of the housing 140, the opposite side walls of the housing 140 may be provided with the first and second magnet mount holes 141*a*, respectively, in which the driving magnets 130 are mounted, disposed or fitted. One or two of the remaining two side walls other than the opposite side walls of the four side walls 141 of the housing 140 may be provided with a third magnet mount hole and the sensor mount hole 141*b*, spaced apart from the third magnet mount hole by a predetermined distance. The other side wall of the four side walls 141 of the housing 140, which faces the one side wall, may be provided with a fourth magnet mount hole.

In other words, the four side walls 141 of the housing 140 may be provided with the four magnet mount holes and the single sensor mount hole 141*b*.

The first magnet mount hole 141*a* and the second magnet mount hole 141*a*' have the same size and shape, and have a lateral length that is almost equal to the entire lateral length of the side wall of the housing 140. Meanwhile, the third magnet mount hole and the fourth magnet mount hole have the same size and shape, and have a lateral length that is smaller than that of the first magnet mount hole 141*a* and the second magnet mount hole 141*a*'. This is because the one side wall, in which the third magnet mount hole is formed, has to be provided with an area required for formation of the sensor mount hole 141*b*.

Of course, the first driving magnet 131 to the fourth driving magnet may be mounted, disposed or fitted in the first magnet mount hole to the fourth magnet mount hole, respectively. Similarly, the first driving magnet 131 and the second driving magnet 132 may have the same size and shape, and may have a lateral length that is almost equal to the entire lateral length of the side wall of the housing 140. Meanwhile, the third driving magnet and the fourth driving magnet may have the same size and shape, and may have a lateral length that is smaller than that of the first driving magnet 131 and the second driving magnet 132.

The third magnet mount hole and the fourth magnet mount hole may be symmetrically disposed in a straight line with respect to the center of the housing 140. In other words, the third driving magnet 130 and the fourth driving magnet 130 may be symmetrically disposed in a straight line with respect to the center of the housing 140. If the third driving magnet 130 and the fourth driving magnet 130 are asymmetrically disposed with respect to the center of the housing 140 to face each other and are deflected to one side of the housing 140, electromagnetic force is not correctly exerted toward the coil 120 of the bobbin 110, but is exerted toward the one side, and thus the bobbin 110 may be tilted. Specifically, since the third driving magnet 130 and the fourth driving magnet 130 are symmetrically disposed in a straight line with respect to the center of the housing 140, electromagnetic force may be correctly exerted toward the bobbin 110 and the coil 120 without deflection, thus easily and accurately guiding the movement of the bobbin 110 in the first direction.

As shown in FIGS. 3 to 6 and 8, the housing 140 may be provided at an upper surface thereof with a plurality of first stoppers 143 which project upward. The first stoppers 143 serve to inhibit collisions of the cover member 300 with the housing 140, and can inhibit the upper surface of the housing 140 from directly colliding with the inner surface of an upper end of the cover member 300 when an external shock is applied thereto. The first stoppers 143 can also serve to guide the installation position of the upper elastic member 150. To this end, as shown in FIG. 9A and the like, the upper elastic member 150 may be provided at positions corresponding to the first stoppers 143 with guide recesses 155 having the shape corresponding to that of the first stoppers 143.

Furthermore, the housing 140 may be provided at an upper surface thereof with a plurality of upper frame support protrusions 144 to which the outer frame 152 of the upper elastic member 150 is coupled. As described hereinafter, the outer frame 152 of the upper elastic member 150 may be provided with first through holes 152*a* having a shape corresponding to that of the upper frame support protrusions 144. The upper frame support protrusions 144 may be bonded to the first through holes 152*a* by means of adhesive or fusion bonding. Fusion bonding may include thermal fusion boding, ultrasonic fusion bonding and the like.

As shown in FIG. 7, the housing 140 may be provided at a lower surface thereof with a plurality of lower frame support protrusions 147 to which the outer frame 162 of the lower elastic member 160 is coupled. The outer frame 162 of the lower elastic member 160 may be provided at positions corresponding to the lower frame support protrusions 147 with fitting recesses or holes 162*a* having a shape corresponding to that of the lower frame support protrusions 147. The lower frame support protrusions 147 may be bonded to the fitting recesses 162*a* by means of adhesive or fusion bonding. Fusion bonding may include thermal fusion boding, ultrasonic fusion bonding and the like.

Although the driving magnets 130 may be secured to the magnet mount holes 141*a* by means of an adhesive, the driving magnets 130 may also be secured by means of adhesive members, such as double-sided adhesive tape, without limitation. In a modification, the housing 140 may be provided at an inner surface thereof with magnet mount recesses in place of the magnet mount holes 141*a*, and the magnet mount recesses may have the size and shape corresponding to those of the driving magnets 130.

The driving magnets 130 may be installed at the positions corresponding to the coil 120 provided around the bobbin 110. The driving magnets 130 may be integrally formed. In this embodiment, the driving magnets 130 may be positioned such that the inner surface of the driving magnet 130 facing the coil 120 of the bobbin 110 serves as the N pole and the outer surface of the driving magnet 130 serves as the S pole. However, this embodiment is not limited thereto, and the reverse configuration is also possible. Furthermore, each of the driving magnets 130 may be divided into two magnet halves by a plane perpendicular to the optical axis.

The driving magnets 130 may be configured to have a cuboid shape having a predetermined width, and may be fitted in the magnet mount holes or recesses 141 such that the wider surfaces of the driving magnets 130 serve as parts of side walls of the housing 140. The driving magnets 130 facing each other may be positioned to be parallel to each other. Furthermore, the driving magnets 130 may be positioned to face the coil 120 of the bobbin 110. The magnet 130 and the coil 120 of the bobbin 110 may be positioned such that the surface of the driving magnet 130 and the surface of the coil 120 are parallel to each other. However, this embodiment is not limited thereto, and only one of the surfaces of the driving magnet 130 and the coil 120 of the bobbin 110 may be flat and the other surface may be curved according to some design. Alternatively, both surfaces of the driving magnet 130 and the coil 120 of the bobbin 110 facing each other may be curved. In this case, both the surfaces of the driving magnet 130 and the coil 120 of the bobbin 110 facing each other may have the same radius of curvature.

As described above, the one side wall of the housing 140 may be provided with the sensor mount hole or recess 141, and the position sensor 180 may be fitted or disposed in the sensor mount hole 141*b*. The position sensor 180 is electrically coupled to the surface of the printed circuit board 170 by means of soldering. In other words, the printed circuit board 170 may be secured, supported or disposed to the outer surface of the one side wall in which the sensor mount hole or recess 141*b* is formed.

The position sensor 180, in addition to the sensing magnet 190 of the bobbin 110, may constitute the displacement detection unit for determining a first displacement value of the bobbin 110 in the first direction. To this end, the position sensor 180 and the sensor mount hole or recess 141*b* may be disposed at positions corresponding to the sensing magnet 190.

The position sensor 180 may be a sensor for detecting variation in magnetic force generated from the sensing magnet 190 of the bobbin 110. Furthermore, the position sensor 180 may be a Hall sensor. However, this embodiment is merely illustrative, and is not limited to the Hall sensor. Any sensor capable of detecting variation of magnetic force may be used as the position sensor 180, and any sensor capable of detecting position in addition to variation of magnetic force may also be used. For example, a photoreflector may be used as the sensor.

The printed circuit board 170 may be coupled or disposed to one side surface of the housing 140, and may have the mount hole or recess 173 as described above. Consequently, the installation position of the printed circuit board 170 may be guided by means of the mount protrusion 149 provided at one side surface of the housing 140.

The printed circuit board 170 may include a plurality of terminals 171 through which external power is supplied. Accordingly, the printed circuit board 170 may supply power to the coil 120 of the bobbin 110 and the position sensor 180. The number of terminals 171 formed at the printed circuit board 170 may be increased or decreased in accordance with the types of components which are required to be controlled. According to this embodiment, the printed circuit board 170 may be embodied as an FPCB.

The plurality of terminals 171 may include a terminal 171 that is connected to a test pin, and the plurality of terminals 171 may include four or six terminals.

The printed circuit board 170 may include a controller for controlling the amount of current applied to the coil 120 based on the first displacement value detected by the displacement detection unit. In other words, the controller is mounted on the printed circuit board 170. In other embodiments, the controller may not be mounted on the printed circuit board 170, but may be mounted on another additional substrate, which may be the substrate on which the image sensor of the camera module is mounted or another additional substrate.

Calibration of driving the distance of the actuator may be additionally performed based on the difference of Hall voltage caused by variation of magnetic flux (i.e. density of magnetic flux detected by the hall sensor).

The bobbin 110 may be constructed to reciprocate in the first direction with respect to the housing 140, which is stationary in the first direction. The autofocusing function may be implemented by movement of the bobbin 110 in the first direction.

The bobbin 110 will be described in more detail later with reference to the accompanying drawings.

The upper elastic member 150 and the lower elastic member 160 may flexibly support upward and/or downward movement of the bobbin 110 in the direction of the optical axis. The upper elastic member 150 and the lower elastic member 160 may be embodied as leaf springs.

As shown in FIGS. 2 to 4 and 9A to 11C, the upper elastic member 150 and the lower elastic member 160 may include inner frames 151 and 161 coupled to the bobbin 110, outer frames 152 and 162 coupled to the housing 140, and connection portions 153 and 163 connecting the inner frames 151 and 161 and the outer frames 152 and 162, respectively.

The connection portions 153 and 163 may be bent at least one time to form a predetermined pattern. The upward and/or downward movement of the bobbin 110 in the direction of the optical axis may be flexibly (or elastically) supported by fine deformation and positional variation of the connection portions 153 and 163.

In the lens moving apparatus according to this embodiment, the printed circuit board 170 may be made of the same material as that of at least one of the upper elastic member 150 and the lower elastic member 160, and may be integrally formed with the upper elastic member 150 as shown in FIGS. 4 and 8 and FIGS. 9A to 11C illustrate only the upper elastic member 150 or the lower elastic member 160 for the convenience of understanding.

The printed circuit board may be embodied as a flexible printed circuit board (FPCB), and may include an insulation layer made of polyimide or polyamide and a conductive layer made of copper (Cu) or the like disposed in the insulation layer. At least one of the upper elastic member 150 and the lower elastic member 160 may include the above-mentioned polyimide or polyamide, and may include a conductive material in a pattern which will be described later.

According to this embodiment, as shown in FIG. 9A, the upper elastic member 150 may include a plurality of first through holes 152*a* formed in the outer frame 152 and a plurality of second through holes 151*a* formed in the inner frame 151.

The first through holes 152*a* may be fitted over the upper frame support protrusions 144 provided on the upper surface of the housing 140, and the second through holes 151*a* may be fitted over upper support protrusions provided on the upper surface of the bobbin 110, which will be described later. Specifically, the outer frame 152 may be secured or coupled to the housing 140 through the first through holes 152*a*, and the inner frame 151 may be secured or coupled to the bobbin 110 through the second through holes 151*a*.

The connection portions 153 may connect the inner frame 151 to the outer frame 152 such that the inner frame 151 is elastically deformable in the first direction with respect to the outer frame 152. More specifically, the connection portions 153 may elastically connect the inner frame 151, secured or coupled to the upper surface of the bobbin 110, to the outer frame 152, secured or coupled to the upper surface of the housing 140. As a result, the bobbin 110 and the housing 140, which are separated from each other, may be elastically connected to each other by means of the upper elastic member 150.

At least one of the inner frame 151 and the outer frame 152 of the upper elastic member 150 may be provided with at least one terminal portion which is conductively connected to at least one of the coil 120 of the bobbin 110 and the printed circuit board 170.

Each of the connection portions 153 may have irregular widths. As shown in FIG. 9A, each of the connection portions 153 may include a second region 153*a*, which has a width greater than that of the remaining region of the connection portion 153. The remaining region of the connection portion 153, other than the second region 153*a* may be referred to as a first region. The second region 153*a* and a second region 163*a*, which will be described later, may be referred to as parasitic regions.

In FIG. 9A, the width (W1) of the first region of the connection portion 153 may be in the range of 30 μm to 60 μm, and the width (W2) of the second region 153*a* of the connection portion 153 may be 1.2 times or more, but less than two times the width (W1) of the first region.

The connection portions 153 may include a plurality of connection portions. FIG. 9A illustrates four connection portions 153 connecting the inner frame 151 to the outer frame 152. The four connection portions 153 may have the same shape, and may be symmetrically disposed with respect to the center of the inner frame 151 or the outer frame 152.

In the embodiment shown in the drawings, the connection portions have a pattern having three bent portions. In the connection portions shown in FIG. 9A, one bent portion serves as the second region 153*a*, which has a larger width than the remaining region. In the connection portions shown in FIG. 9B, two bent portions serve as the second regions 153*a*, which have a larger width than the remaining region. In the connection portions shown in FIG. 9C, three bent portions serve as the second regions 153*a*, which have a larger width than the remaining region.

As shown in FIG. 10A and the like, the lower elastic member 160 may include a plurality of fitting recesses or holes 162*a* formed in the outer frame 162 and a plurality of third through holes or recesses 161*a* formed in the inner frame 161.

The fitting recesses or holes 162*a* may be fitted over the lower frame support protrusions 147 provided at the lower surface of the housing 140, and the third holes or recesses 161*a* may be fitted over lower support protrusions 114 provided at the lower surface of the bobbin 110, which will be described later. Specifically, the outer frame 162 may be secure or coupled to the housing 140 through the fitting recesses or holes 162*a*, and the inner frame 161 may be secured or coupled to the bobbin 110 through the third through holes or recesses 161*a*.

The connection portions 163 may connect the inner frame 161 to the outer frame 162 such that the inner frame 161 is elastically deformable in the first direction with respect to the outer frame 162 by a predetermined distance. Specifically, the connection portions 163 may elastically connect the inner frame 161, secured or coupled to the lower surface of the bobbin 110, to the outer frame 162, secured or coupled to the lower surface of the housing 140. As a result, the bobbin 110 and the housing 140, which are separated from each other, may be elastically connected at lower ends thereof to each other by means of the lower elastic member 160.

As shown in FIG. 10A and other drawings, the lower elastic member 160 may include a first lower elastic member 160*a* and a second lower elastic member 160*b*, which are separated from each other. Thanks to the structure comprising two halves, the lower elastic member 160 may receive powers of different polarities or different powers through the first lower elastic member 160*a* and the second elastic member 160*b*. More specifically, after the inner frame 161 and the outer frame 162 are coupled to the bobbin 110 and the housing 140, respectively, solder portions are provided at the positions on the inner frame corresponding to the two ends of the coil 120 provided at the bobbin 110. Conductive connection, such as soldering, is performed at the solder portions so as to enable the powers of different polarities or the powers different from each other to be applied thereto. In addition, since the first lower elastic member 160*a* is conductively connected to one of the both ends of the coil 120 and the second lower elastic member 160*b* is conductively connected to the other of the both ends of the coil 120, external current and/or voltage may be applied thereto.

The upper elastic member 150, the lower elastic member 160, the bobbin 110 and the housing 140 may be assembled through a bonding process using thermal fusion and/or adhesive. The assembly process may be implemented by securing the components to one another by thermal fusion and then bonding the components to one another using adhesive.

In a modification, the upper elastic member 150 may be composed of the two halves, and the lower elastic member 160 may be integrally constructed.

At least one of the inner frame 161 and the outer frame 162 of the lower elastic member 160 may be provided with at least one terminal portion, which is conductively connected to at least one of the coil 120 of the bobbin 110 and the printed circuit board 170.

The damping unit 410 may serve as an attenuator for absorbing vibration in the optical axis generated during lens driving or autofocusing of the lens moving apparatus 100. The damping unit 410 may be provided between a stationary body which is held in place without movement during autofocusing of the lens moving apparatus 100 and a movable body which is moved in the direction of the optical axis during autofocusing of the lens moving apparatus 100. For example, the stationary body may be the cover member 300, the housing 140, the base 210, the outer frames of the upper elastic member 150 and/or the lower elastic member 160 or the like, and the movable body may be the bobbin 110, the lens, the coil 120, the inner frames of the upper elastic member 150 and/or the lower elastic member 160 or the like.

In FIG. 10A, the width (d1) of the first region of the connection portion 163 may be in a range of 30 μm to 60 μm, and the width (d2) of the second region 163*a* of the connection portion 163 may be 1.2 times or more, but less than two times the width (d1) of the first region.

The connection portions 163 may include a plurality of connection portions. FIG. 10A illustrates four connection portions 163 connecting the inner frame 161 to the outer frame 162. The four connection portions 163 may have the same shape, and may be symmetrically disposed with respect to the center of the inner frame 161 or the outer frame 162.

In the embodiment shown in the drawings, the connection portions 163 have a pattern having two bent portions. In the connection portions shown in FIG. 10A, one bent portion serves as the second region 163*a*, which has a larger width than the remaining region. In the connection portions shown in FIG. 10B, two bent portions serve as the second regions 163*a*.

FIGS. 11A to 11C are views schematically showing the arrangement of dampers according to an embodiment.

As shown in FIGS. 11A and 11B, the dampers 158 are disposed to connect the housing 140 to the connection portions 153, and are made of a silicone material. Each of the dampers 185 may be disposed to one bent portion of the pattern of the connection portion 153 so as to contact it. Furthermore, the each of the dampers 158 may also be disposed to all three bent portions of the connection portion 153 to contact them.

As shown in FIGS. 11A-11C, the dampers 158 may be respectively provided at all the connection portions 153, and may be symmetrically disposed with respect to the center of the inner frame 151 or the outer frame 152.

Figure 12:
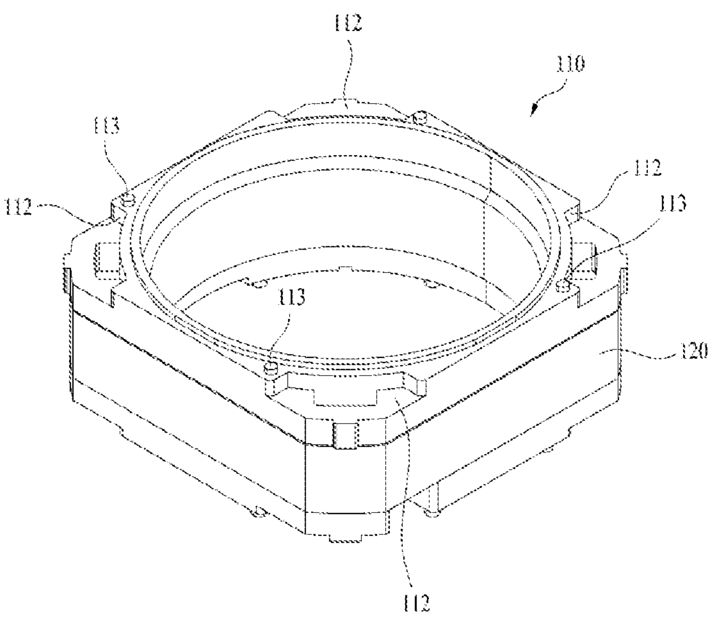
FIG. 12 is a schematic perspective view of a bobbin in the lens moving apparatus shown in FIG. 1.
Figure 13:
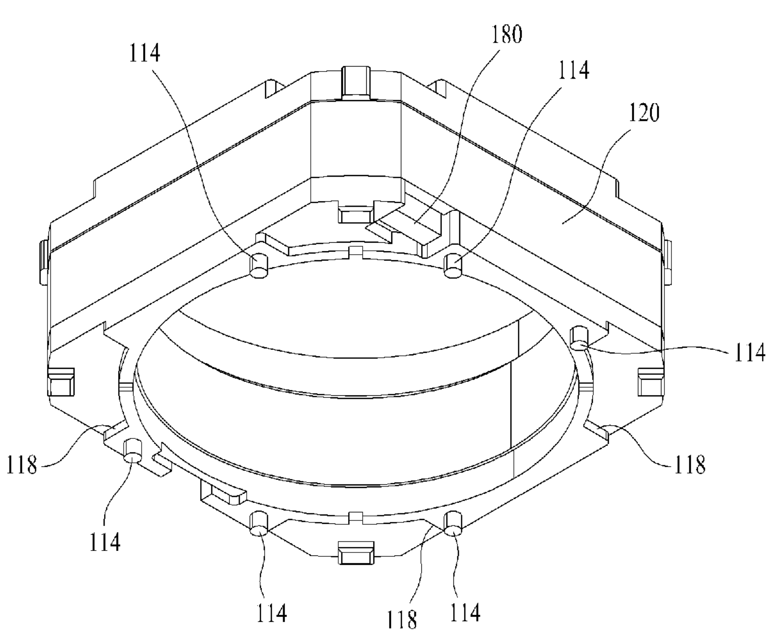
FIG. 13 is a schematic bottom perspective view of the bobbin in the lens moving apparatus shown in FIG. 1.
Figure 14:
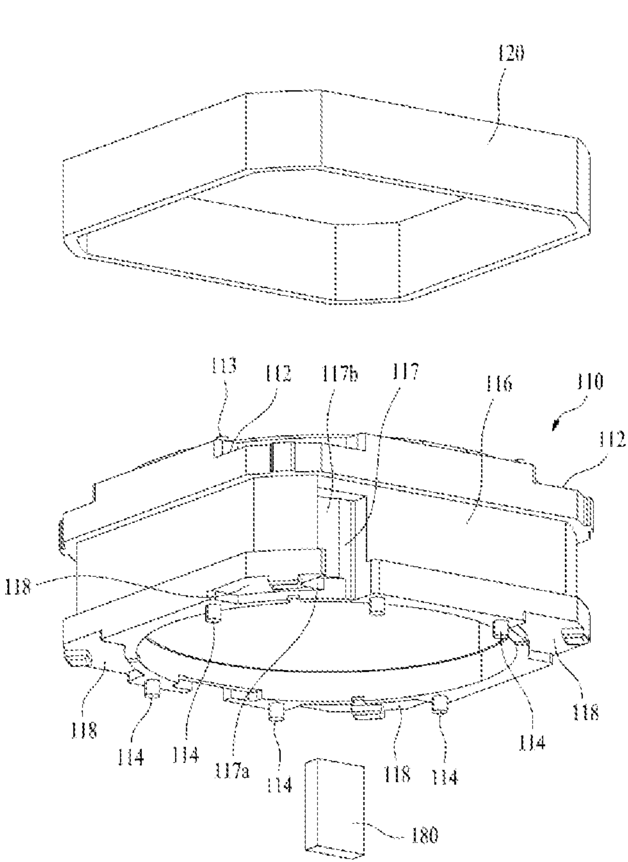
FIG. 14 is a schematic exploded perspective view of the bobbin in the lens moving apparatus shown in FIG. 1.
Figure 15:
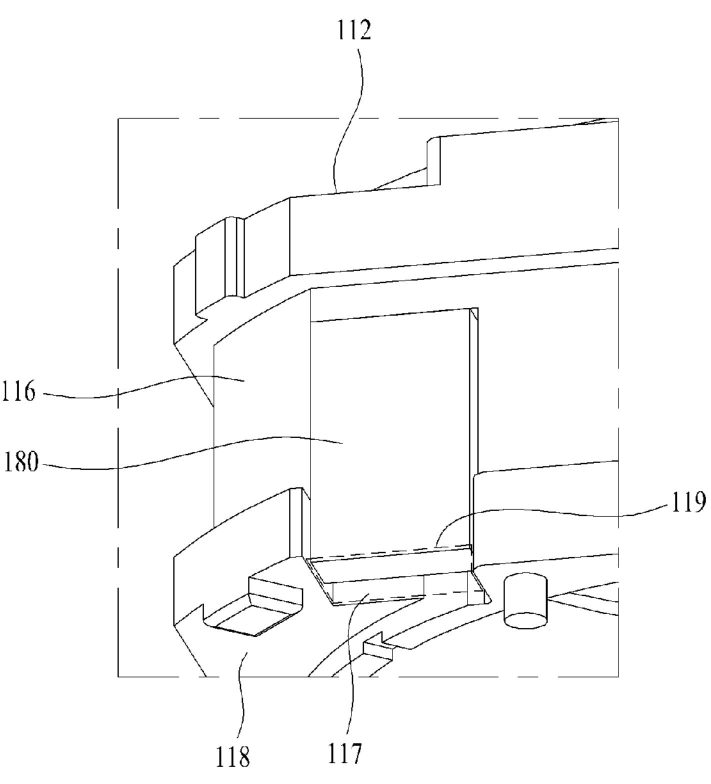
FIG. 15 is a fragmentary enlarged perspective view of FIG. 14.
Figure 16:
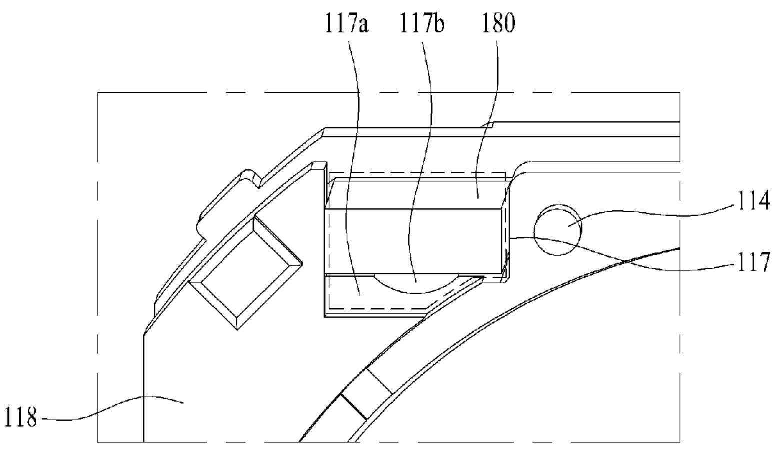
FIG. 16 is a fragmentary enlarged bottom view of FIG. 14.
Figure 17:
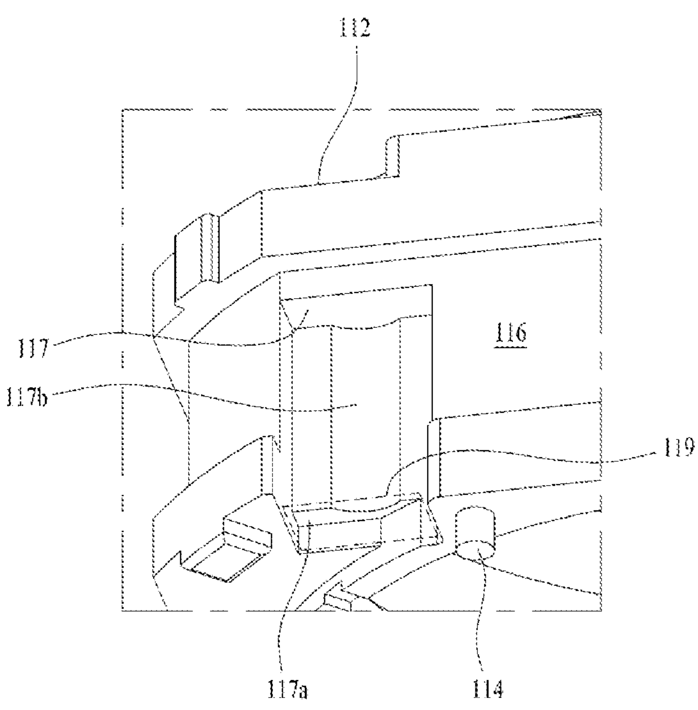
FIG. 17 is a schematic enlarged perspective view of a reception recess in the lens moving apparatus shown in FIG. 1.
Figure 18:
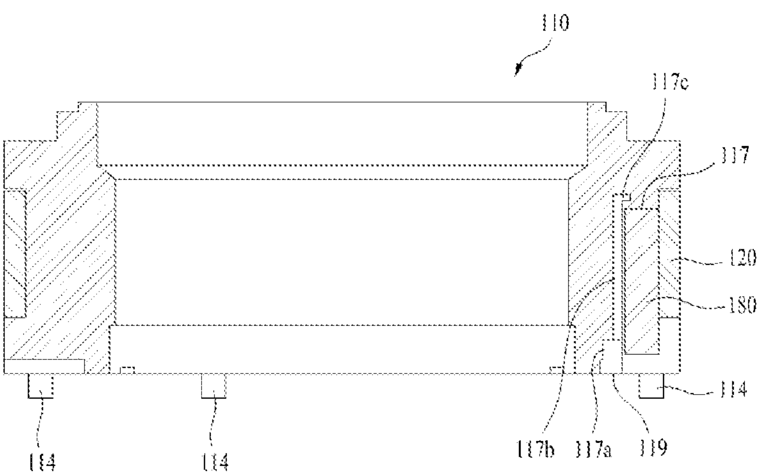
FIG. 18 is a schematic longitudinal cross-sectional view of the bobbin in the lens moving apparatus shown in FIG. 1.

FIG. 12 is a schematic perspective view of the bobbin of the lens moving apparatus shown in FIG. 1. FIG. 13 is a schematic bottom perspective view of the bobbin of the lens moving apparatus shown in FIG. 1. FIG. 14 is a schematic exploded perspective view of the bobbin of the lens moving apparatus shown in FIG. 1. FIG. 15 is a fragmentary enlarged perspective view of FIG. 14. FIG. 16 is a fragmentary enlarged view of FIG. 14. FIG. 17 is a schematic fragmentary enlarge perspective view of the reception recess of the lens moving apparatus shown in FIG. 1. FIG. 18 is a schematic longitudinal cross-sectional view of the bobbin of the lens moving apparatus shown in FIG. 1.

As shown in FIGS. 12 to 18, the bobbin 110 may be disposed in the internal space of the housing 140 so as to be reciprocated in the direction of the optical axis. The bobbin 110 may be provided on the outer surface thereof with the coil 120 such that the coil 120 electromagnetically interacts with the driving magnet 130 of the housing 140. Consequently, the electromagnetic interaction between the coil 120 and the driving magnet 130 may cause the bobbin 110 to reciprocate in the first direction. The bobbin 110 may be flexibly (or elastically) supported by the upper elastic member 150 and the lower elastic member 160, and may move in the first direction, that is, in the direction of the optical axis to implement the autofocusing function.

Although not shown in the drawings, the bobbin 110 may include a lens barrel (not shown) in which at least one lens is installed. However, the lens barrel, which is a component of the camera module which will be described later, may not be an essential component of the lens moving apparatus. The lens barrel may be coupled in the bobbin 110 in various ways. For example, the lens barrel may be coupled in the bobbin 110 via a threaded engagement by forming a female threaded portion in the inner surface of the bobbin 110 while forming a male threaded portion, corresponding to the female threaded portion, in the outer surface of the lens barrel. However, this embodiment is not limited thereto, and the lens barrel may be directly secured in the bobbin 110 by various coupling ways other than the threaded engagement without the formation of a female threaded portion in the inner surface of the bobbin 110. Alternatively, the at least one lens may be integrally formed with the bobbin 110 without the provision of the lens barrel. The lens coupled in the lens barrel may include a single lens, or two or more lenses so as to constitute an optical system.

The bobbin 110 may be provided at upper and lower surfaces thereof with a plurality of upper support protrusions 113 and a plurality of lower support protrusions 114.

As shown in FIG. 12, the upper support protrusions 113 may be configured to have a cylindrical shape of a polygonal column shape, and may enable the inner frame 151 of the upper elastic member 150 to be coupled or secured to the bobbin 110. According to this embodiment, the inner frame 151 of the upper elastic member 150 may be provided with the second through holes or recesses 151*a* at positions thereof corresponding to the upper support protrusions 113. Here, the upper support protrusions 113 may be secured to the second through holes or recesses 151*a* by means of thermal fusion or an adhesive material, such as epoxy. The upper support protrusions 113 may include a plurality of upper support protrusions. The distance between the upper support protrusions 113 may be appropriately adjusted to such a degree that the upper support protrusions 113 do not interfere with peripheral elements. In other words, the upper support protrusions 113 may be symmetrically disposed at regular intervals with respect to the center of the bobbin 110, or may be symmetrically disposed at irregular intervals with respect to a specific imaginary line extending through the center of the bobbin 110.

As shown in FIG. 13, the lower support protrusions 114 may be configured to have a cylindrical shape or a polygonal column shape like the upper support protrusions 113, and may enable the inner frame 161 of the lower elastic member 150 to be coupled or secured to the bobbin 110. According to this embodiment, the inner frame 161 of the lower elastic member 160 may be provided with the third through holes or recesses 161*a* at positions thereof corresponding to the lower support protrusions 114. Here, the lower support protrusions 114 may be secured to the second third holes or recesses 161*a* by means of thermal fusion or an adhesive material, such as epoxy. The lower support protrusions may 114 include a plurality of upper support protrusions, as shown in FIG. 13. The distance between the lower support protrusions 114 may be appropriately adjusted to such a degree that the lower support protrusions 114 do not interfere with peripheral elements. In other words, the lower support protrusions 114 may be symmetrically disposed at regular intervals with respect to the center of the bobbin 110.

The bobbin 110 may be provided at upper and lower surfaces thereof with upper refuge recesses 112 and lower refuge recesses 118 such that the upper and lower refuge recesses 112 and 118 are disposed at positions corresponding to the connection portions 153 of the upper elastic member 150 and the connection portions 163 of the lower elastic member 160.

Thanks to the provision of the upper refuge recesses 112 and the lower refuge recesses 118, elastic deformation of the connection portions 153 and 163 may be more easily obtained by avoiding the interference between the connection portions 153 and 163 and the bobbin 110 when the bobbin 110 is moved in the first direction with respect to the housing 140. Although the upper refuges recesses may be positioned at the corners of the housing 140, as in this embodiment, they may be positioned at the side surfaces of the housing depending on the shape and/or position of the connection portions of the elastic members.

Although the bobbin 110 may be provided at an outer surface thereof with a coil mount groove 116, around which the coil 120 is mounted, the bobbin 110 may also be provided with only coil mount seat.

Although the coil 120 may be embodied as an annular coil block which is mounted on or fitted in the outer surface of the bobbin 110, the coil mount groove 116 or the coil mount seat, the coil 120 should not be construed as being limited thereto. The coil 120 may be directly wound around the outer surface of the bobbin 110 or the coil mount groove 116 or the coil mount seat.

According to this embodiment, the coil 120 may be configured to have an approximately octagonal shape, as shown in FIG. 14. This is configured to correspond to the outer surface of the bobbin 110, and thus the bobbin 110 may also be configured to have the octagonal shape. At least four surfaces of the coil 120 may be flat, and the corner surfaces connecting the four surfaces may be curved or flat. Among these surfaces, the flat surfaces may be configured to correspond to the driving magnets 130. The surfaces of the driving magnet 130, which correspond to the coil 120, may have the same radius of curvature as that of the coil 120. More specifically, if the surfaces of the coil 120 are flat, the corresponding surfaces of the driving magnets 130 may also be flat. If the surfaces of the coil 120 are curved, the corresponding surfaces of the driving magnet 130 may also be curved. In addition, the surfaces of the coil 120 and the surfaces of the driving magnet 130 may have the same radius of curvature. Even if the surfaces of the coil 120 are curved, the corresponding surfaces of the driving magnets 130 may be flat, and vice versa.

The coil 120 serves to move the bobbin 110 in the direction of the optical axis for implementation of autofocusing function. When current is supplied to the coil 120, electromagnetic interaction between the driving magnets 130 and the coil 120 creates electromagnetic force, thus causing the bobbin 110 to be moved due to the created electromagnetic force.

The coil 120 may be configured to correspond to the driving magnets 130. When each of the driving magnets 130 is constituted by a single body and thus the entire area of the surface of the driving magnet 130 facing the coil 120 has the same polarity, as shown in the drawings, the surface of the coil 120 corresponding to the driving magnet 130 may have the same polarity. Although not shown in the drawings, when each of the driving magnets 130 is divided into two or more magnet halves by a plane perpendicular to the optical axis and thus the surface of the magnet 130 facing the coil 120 is divided into two or more sectioned surfaces, the coil 120 may also be divided into the same number of coils as the number of such sectioned surfaces.

The bobbin 110 may include the sensing magnet 190, which constitutes, in conjunction with the position sensor 180 of the housing 140, the displacement detection unit. The sensing magnet 190 may be secured, disposed or coupled to the bobbin 110. Hence, when the bobbin 110 moves in the first direction, the sensing magnet 190 may move in the first direction by the same amount of displacement as that of the bobbin 110. The sensing magnet 190 may be constituted by a single body. The sensing magnet 190 may be positioned such that the upper surface of the bobbin 110 serves as the N pole and the lower surface of the bobbin 110 serves as the S pole. However, this embodiment is not limited thereto, and the reverse configuration is possible. In addition, the sensing magnet 190 may also be divided into two sectioned magnets by a plane perpendicular to the optical axis.

As shown in FIGS. 14 to 18, the bobbin 110 may be provided at the outer surface thereof with a reception recess 117 for receiving the sensing magnet 190.

The reception recess 117 may be formed a predetermined depth inward from the outer surface of the bobbin 110.

Specifically, the reception recess 117 may be formed in one side surface of the bobbin 110 such that at least a portion of the reception recess 117 is positioned in the coil 120. Furthermore, the reception recess 117 may be at least partially formed in the bobbin 110 by a predetermined depth, which is deeper than the coil mount groove 116. Since the reception recess 117 is formed in the bobbin 110 in this way, the sensing magnet 190 may be received in the bobbin 110. As a result, there is no need to provide an additional installation space for the sensing magnet 190, thus improving the space efficiency of the bobbin 110.

Particularly, the reception recess 117 may be disposed at the position corresponding to the position sensor 180 of the housing 140 (or the position corresponding to the position sensor 180). Therefore, since the distance between the sensing magnet 190 and the position sensor 180, which is the sum of the thickness of the coil 120 and the spacing distance between the coil 120 and the position sensor 180 or the distance between the coil 120 and the position sensor 180, may be minimized, it is possible to improve the accuracy of detection of magnetic force by the position sensor 180.

The reception recess 117 may include an opening, which is formed in the upper or lower surface of the bobbin 110 and communicates with the reception recess 117. For example, a part of the lower surface of the bobbin 110 may be opened to define the opening 119, and the opening 119 may serve as an inlet port of the reception recess 117, as shown in FIG. 18. Accordingly, the sensing magnet 190 may be fitted, disposed or secured in the reception recess 117, and may be removed from the reception recess 117 through the opening 119.

As shown in FIGS. 16 to 18, more specifically, the reception recess 117 may include an inner surface by which one side of the sensing magnet 190 is supported, and an adhesive groove 117*b*, which is formed to be concave inward from the inner surface by a predetermined depth to receive adhesive therein.

The inner surface of the reception recess 117 is positioned toward the center of the bobbin 110. When the sensing magnet 190 has a rectangular parallelepiped shape, a larger surface of the sensing magnet 190 is mounted on the inner surface.

The adhesive groove 117*b* may be a groove which is formed to be concave toward the center of the bobbin 110 at a portion thereof so as to be deeper than the inner surface. The adhesive groove 117*b* may be formed from the opening 119 to the inner surface of the bobbin 110 on which the inner end surface of the sensing magnet 190 is mounted or disposed.

As shown in FIG. 18, the adhesive groove 117*b* may further include a first additional groove 117*c* which is formed in a vertical thickness direction of the bobbin 110 so as to be deeper than the inner end of the sensing magnet 190. The first additional groove 117*c* is an extension of the adhesive groove 117*b* which is formed to be deeper than the inner end surface of the bobbin 110 on which the inner end surface of the sensing magnet 190 is mounted or disposed. Thanks to the provision of the first additional groove 117*c*, adhesive is injected into the adhesive groove 117*b* through the opening 119, the first additional groove 117*c* is first filled with the adhesive, and then the adhesive groove 117*b* is filled with the adhesive. Accordingly, it is possible to inhibit the adhesive overflowing from the adhesive groove 117*b* from reaching the coil 120 through the clearance between the sensing magnet 190 and the surfaces of the reception recess 117, and thus it is possible to reduce the occurrence of defective lens moving apparatus 100 during the procedure of assembling the sensing magnet 190.

The adhesive groove 117*b* may further include a second additional groove 117*a* which is formed at an area near the opening 119 and toward the center of the bobbin 110 by a predetermined depth. Specifically, the second additional groove 117*a* may be positioned in the vicinity of the opening 119 and may be formed toward the center of the bobbin 110 to be deeper than the inner surface of the reception recess 117. The second additional groove 117*a* communicates with the adhesive groove 117*b*. In other words, the second additional groove 117*a* is an extension of the adhesive groove 117*b*. Thanks to the provision of the second additional groove 117*a*, adhesive may be injected into the adhesive groove 117*b* through the second additional groove 117*a*. Accordingly, it is possible to inhibit adhesive from overflowing in the vicinity of the opening 119 and adhering to other components, such as the coil and the bobbin 110, thus reducing the occurrence of defective lens moving apparatus 100 during the procedure of assembling the sensing magnet 190.

In a modification, the second additional groove 117*a* may be provided alone at the bobbin 110 without the adhesive groove 117*b*. In this case, the bobbin 110 and the sensing magnet 190 may be coupled and secured to each other by injecting adhesive into the second additional groove 117*a*.

The adhesive groove 117*b* may include at least one of the first additional groove 117*c* and the second additional groove 117*a*. In other words, the adhesive groove 117*b* may include only the first additional groove 117*c*, or may include only the second additional groove 117*a*.

In a modification, the reception recess 117 may be configured such that the distance between the inner surface of the reception recess 117, by which one surface (i.e. the larger surface) of the sensing magnet is supported, and the outer surface of the bobbin 110 (i.e. the surface of the coil mount groove 116) is equal to or less than the thickness of the sensing magnet 190. Consequently, the sensing magnet 190 may be secured in the reception recess 117 by the pressing force of the coil wound thereon. Hence, there is no need for the provision of adhesive.

Although not shown in the drawings, in an additional embodiment, the bobbin 110 may further include an additional reception groove 117 which is formed in the outer surface of the bobbin 110 at a position symmetrical to the original reception recess 117 with respect to the center of the bobbin 110, and a weight balancing member received in the additional reception recess 117.

In other words, the additional reception recess 117 may be formed at a position on the outer surface of the bobbin 110 so as to be opposite to the original reception recess 117 and to be linearly symmetrical to the original reception hole 117 with respect to the center of the bobbin 110, and may be formed inward from the outer surface of the bobbin 110 by a predetermined depth. The weight balancing member may be securely fitted in the additional reception recess 117, and may have the same weight as the sensing magnetic 190.

Thanks to the provision of the additional reception recess 117 and the weight balancing member, it is possible to compensate for weight imbalance of the bobbin 110 in the horizontal direction due to the presence of the reception recess 117 and the sensing magnet 190.

The additional reception recess 117 may include at least one of the adhesive groove 117*b*, the first additional groove 117*c* and the second additional groove 117*a*.

Figure 19:
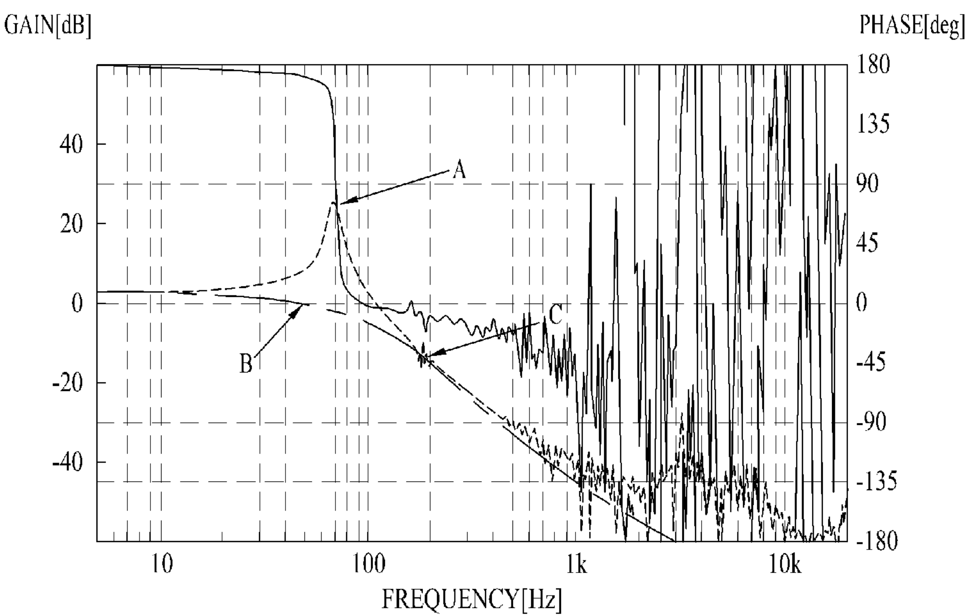
FIG. 19 is a view showing the relationship between gain and phase in a first embodiment of the lens moving apparatus.

FIG. 19 is a view showing the relationship between gain and phase in the lens moving apparatus according to the embodiment. According to the embodiment, when the upper elastic member is made of polyimide or the like and is integrally formed with the printed circuit board, the peak value may be decreased and frequency changing may occur, as indicated by "B". Furthermore, when the damper and the parasitic region in the connection portions of the upper and lower elastic members are provided, the peak value may be decreased and frequency changing may occur, thus suppressing noise and inhibiting an oscillation phenomenon during driving of the vibration motor or the like, as indicated by "A" and "C".

Figure 20A:
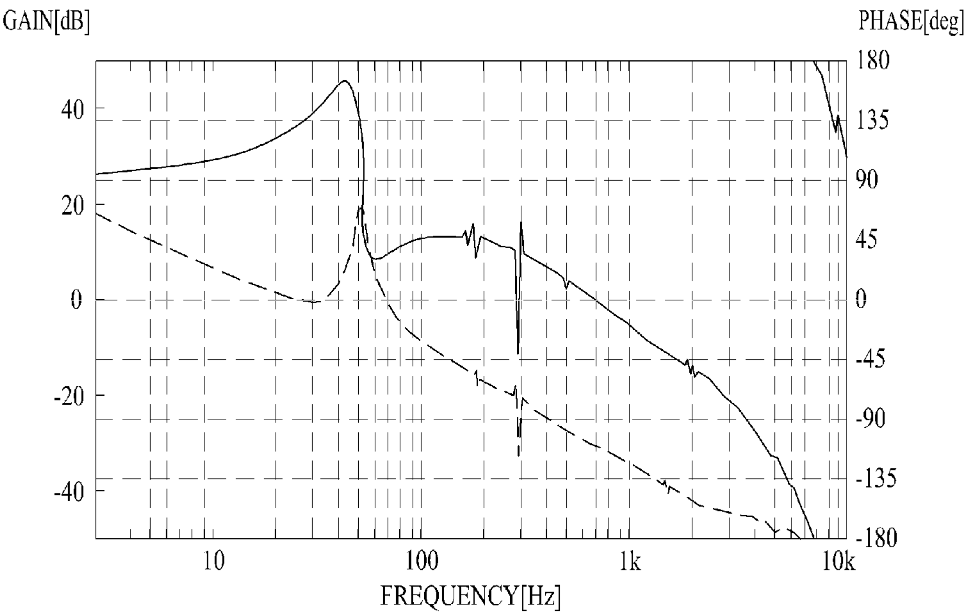
FIGS. 20A-20C are views showing an oscillation phenomenon occurring when gain is gradually increased in the first embodiment of the lens moving apparatus.
Figure 20B:
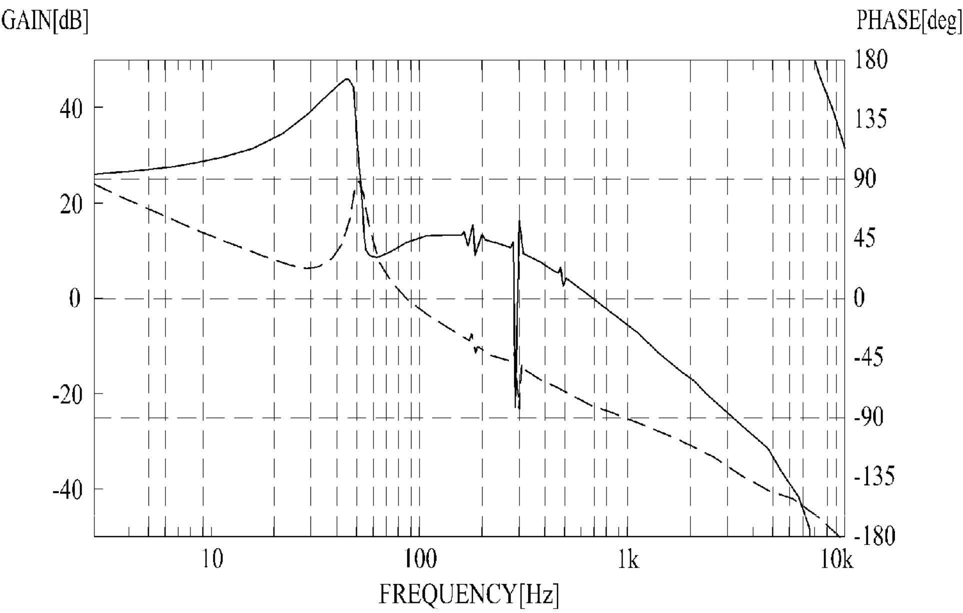
Figure 20C:
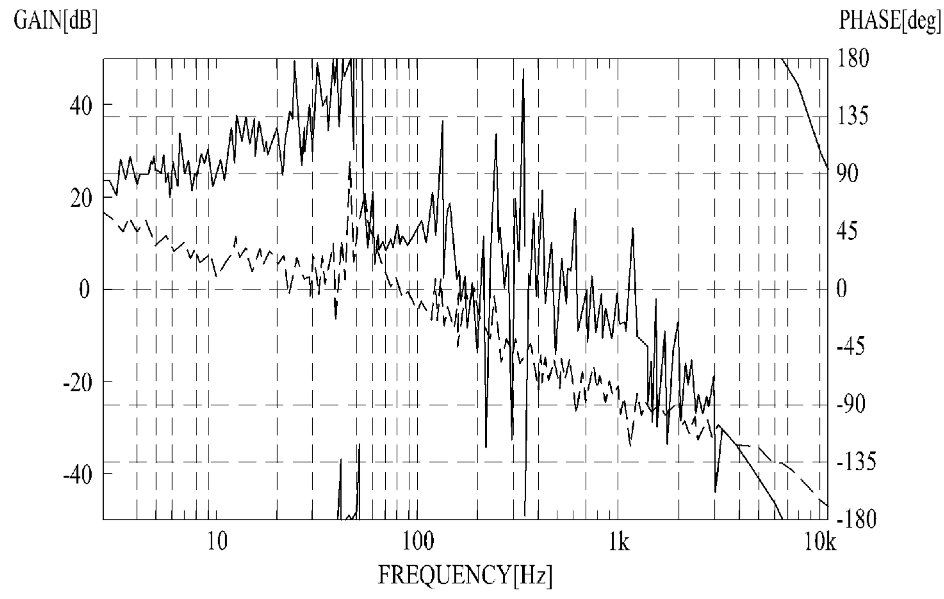
Figure 21:
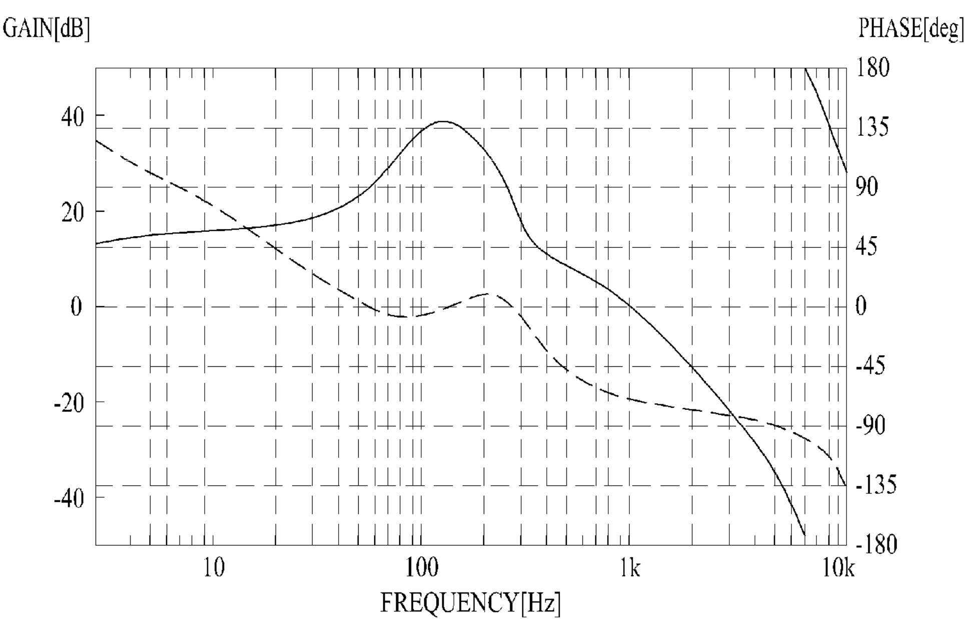
FIG. 21 is a view showing that frequency properties are changed, and thus an oscillation phenomenon is inhibited in the first embodiment of the lens moving apparatus.

FIGS. 20A-20C are views showing an oscillation phenomenon occurring when gain is gradually increased in the lens moving apparatus, and FIG. 21 is a view showing that, when the upper or lower elastic member is made of the same material as an FPCB or the dampers and the parasitic regions in the connection portions of the upper or lower elastic member are provided, frequency properties are changed, and thus an oscillation phenomenon is inhibited.

Figure 22:
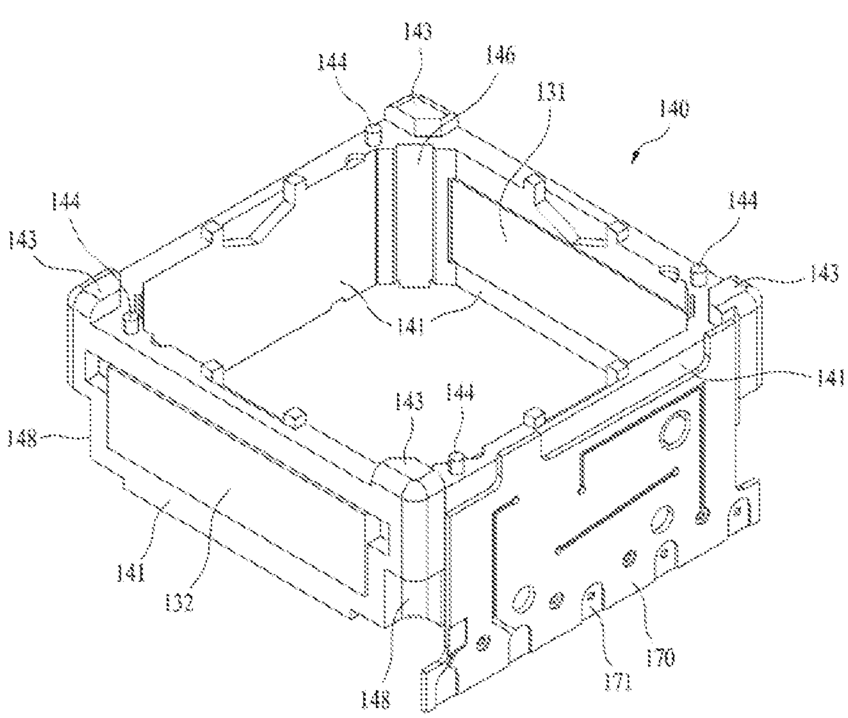
FIG. 22 is a schematic perspective view of a housing according to a second embodiment of the lens moving apparatus.
Figure 23:
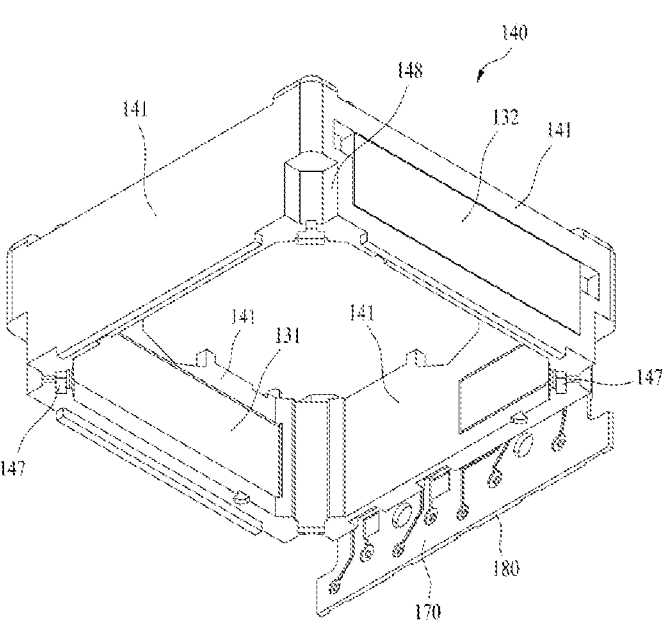
FIG. 23 is a schematic bottom perspective view of the housing according to the second embodiment of the lens moving apparatus.
Figure 24:
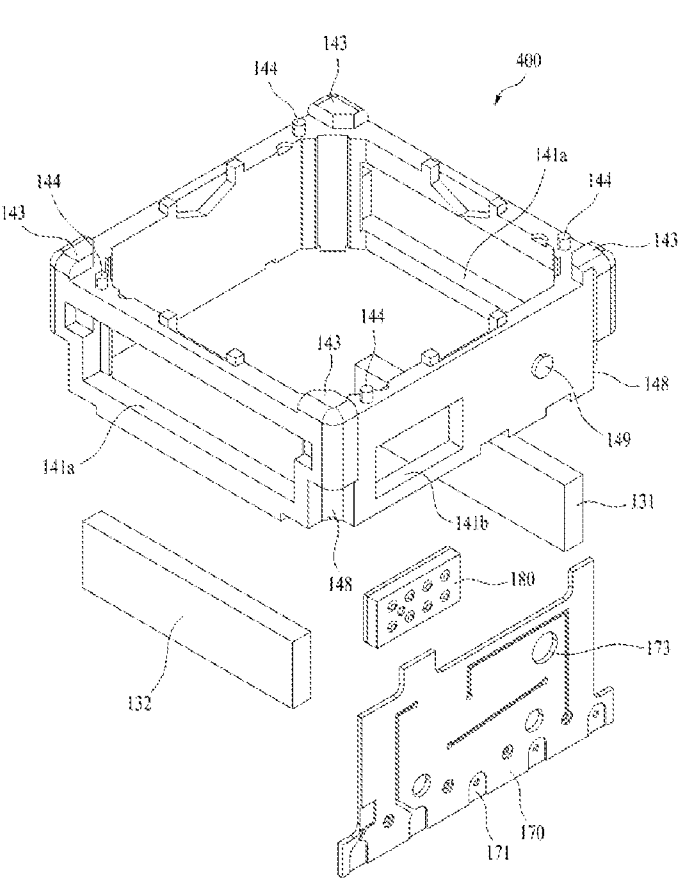
FIG. 24 is a schematic exploded perspective view of a second embodiment of the lens moving apparatus.

FIG. 22 is a schematic perspective view of a housing according to a second embodiment of the lens moving apparatus. FIG. 23 is a schematic bottom perspective view of the housing according to the second embodiment of the lens moving apparatus. FIG. 24 is a schematic exploded perspective view of a second embodiment of the lens moving apparatus. Descriptions of components of the second embodiment that are the same as those of the first embodiment of the lens moving apparatus will be omitted.

As shown in FIG. 8, the printed circuit board 170 is provided on one surface of the housing 140. The printed circuit board 170 includes the plurality of terminals 171 through which external power is supplied thereto, thus enabling current to be supplied to the coil 120 of the bobbin 110 and the position sensor 180. The printed circuit board 170 may include the mount hole or recess (173) as shown in the drawings. The number of the terminals 171 provided at the printed circuit board 170 may be increased or decreased depending on the types of components required to be controlled. According to this embodiment, the printed circuit board 170 may be constituted by an FPCB.

Figure 25:
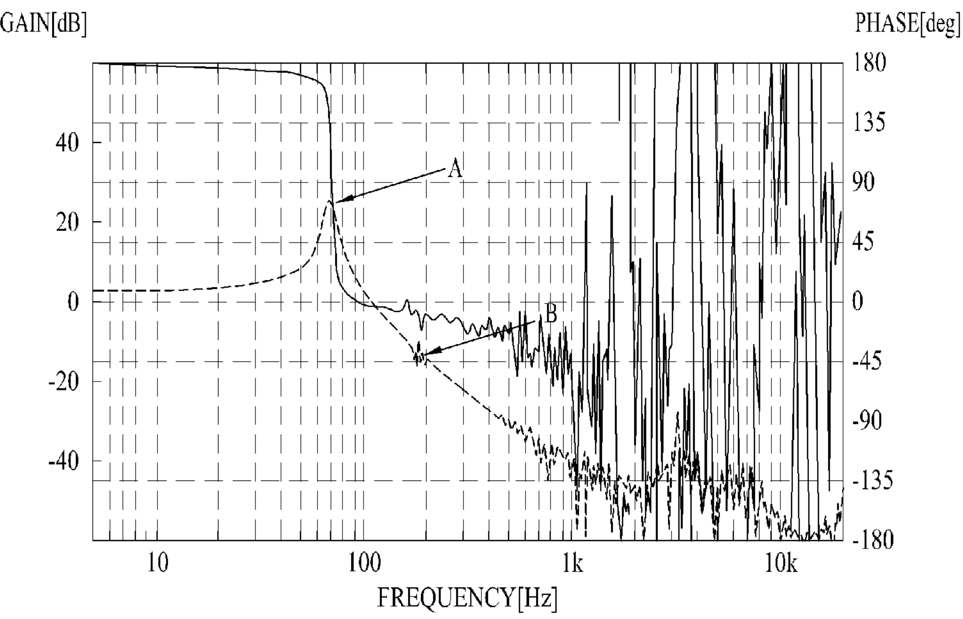
FIG. 25 is a view showing the relationship between gain and phase in the second embodiment of the lens moving apparatus.

FIG. 25 is a view showing the relationship between gain and phase in the second embodiment of the lens moving apparatus.

In this embodiment, when the dampers and the parasitic regions in the connection portions of the upper or lower elastic member are provided, the peak value may be decreased and frequency changing may occur, thus suppressing noise and inhibiting an oscillation phenomenon during driving of the vibration motor or the like, as indicated by "A" and "B".

Figure 26A:
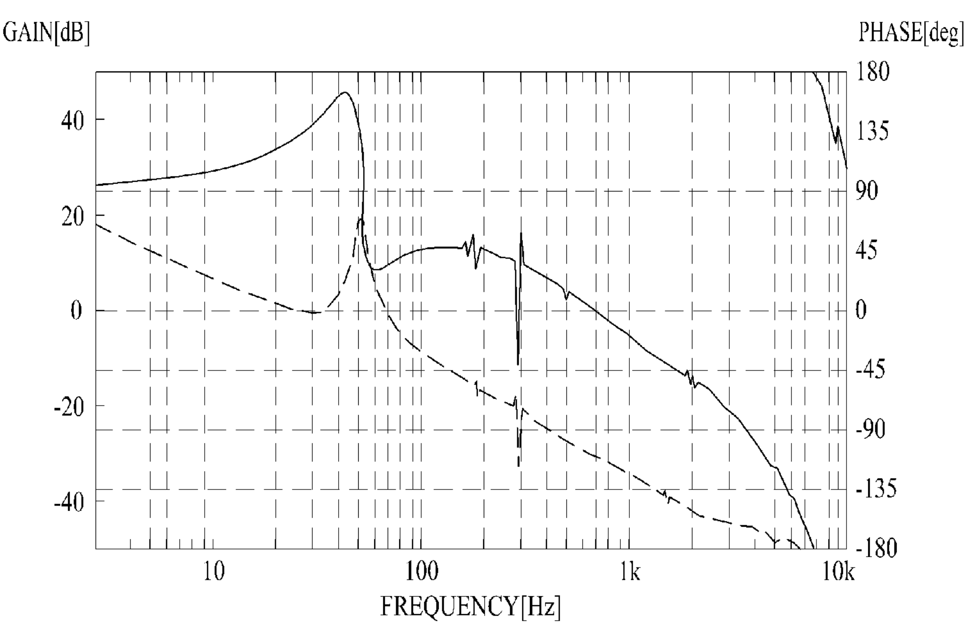
FIGS. 26A-26C are views showing an oscillation phenomenon occurring when gain is gradually increased in the second embodiment of the lens moving apparatus.
Figure 26B:
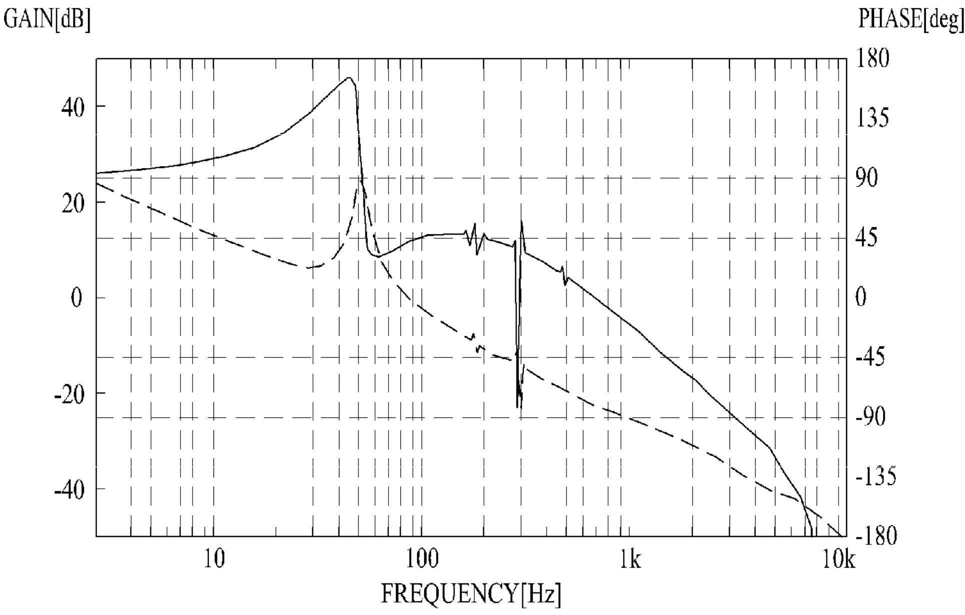
Figure 26C:
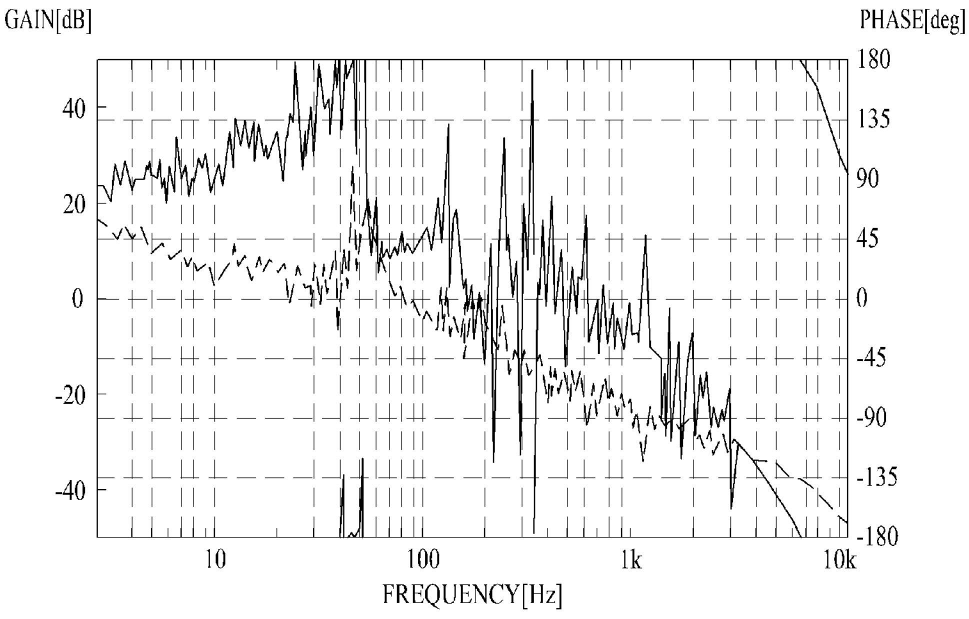
Figure 27:
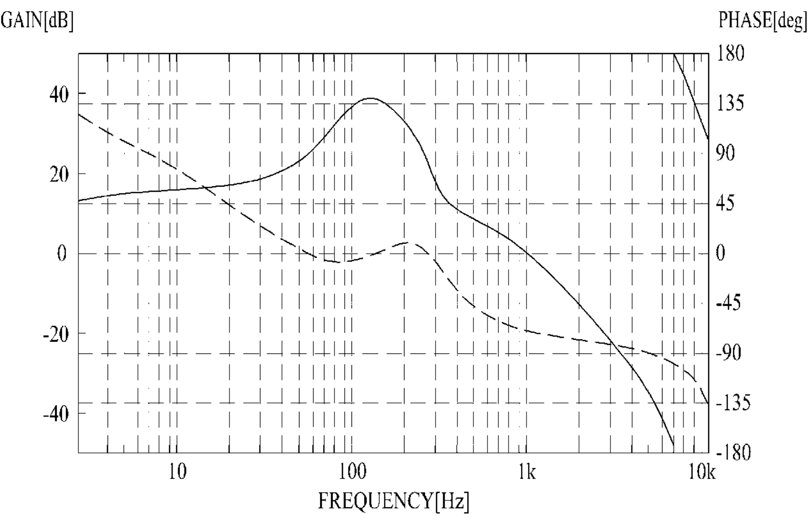
FIG. 27 is a view showing that frequency properties are changed and thus an oscillation phenomenon is inhibited in the second embodiment of the lens moving apparatus.

FIGS. 26A-26C are views showing an oscillation phenomenon occurring when gain is gradually increased in the second embodiment of the lens moving apparatus, and FIG. 27 is a view showing that, when the dampers and the parasitic regions in the connection portions of the upper or lower elastic member are provided, frequency properties are changed, thus inhibiting an oscillation phenomenon.

The lens moving apparatus, which is constructed as described above, may include the lens barrel coupled to the bobbin, the image sensor and the printed circuit board. In this case, the printed circuit board may be provided with the image sensor mounted thereon, and may constitute the bottom surface of the camera module.

The bobbin 110 may include the lens barrel in which at least one lens is installed. The lens barrel may be constructed to be threadably coupled in the bobbin 110. However, this embodiment is not limited thereto, and the lens barrel may be directly secured in the bobbin 110 by various coupling ways other than the threaded engagement. Alternatively, the at least one lens may be integrally formed with the bobbin 110 without provision of the lens barrel.

The lens coupled to the lens barrel may include a single lens, or two or more lenses so as to constitute an optical system. The base may further include an infrared shielding filter provided at a position corresponding to that of the image sensor, and may be coupled to the housing.

Furthermore, the base may support a lower portion of the housing. The base may be provided with an additional terminal member for conductive connection with the printed circuit board. It is also possible to integrally form a terminal using a surface electrode or the like.

The base may serve as a sensor holder for protecting the image sensor. In this case, a projection extending downward may be formed along lateral surfaces of the base. However, this is not an essential component of the lens moving apparatus, and an additional sensor holder (not shown) may be disposed on a lower part of the base to serve as the projection.

As is apparent from the above description, according to the lens moving apparatus according to the embodiments, the upper or lower elastic member is made of the same material as an FPCB or the dampers and the parasitic regions in the connection portions of the upper or lower elastic member are provided, thus suppressing noise and inhibiting an oscillation phenomenon during driving of the vibration motor or the like.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lens moving apparatus comprising:

a housing;

a bobbin disposed in the housing;

a first magnet disposed on the housing;

a coil disposed on the bobbin;

an elastic member comprising a first elastic part and a second elastic part; and a damper contacted with the elastic member, wherein the first elastic part comprises a first outer frame coupled to the housing, a first inner frame coupled to the bobbin, and a first connection portion connecting the first outer frame and the first inner frame, wherein the first connection portion comprises a first end connected to the first outer frame and a second end connected to the first inner frame, wherein the damper comprises a first damper contacted with the first connection portion, wherein the first outer frame comprises a first hole coupled to a first part of the housing, wherein the first inner frame comprises a first hole coupled to a first part of the bobbin, wherein the first damper is closer to the first end of the first connection portion than to the second end of the first connection portion, wherein the first damper is closer to the first hole of the first outer frame than to the first hole of first the inner frame, wherein the first connection portion comprises:

a first region on which the first damper is disposed; and a second region positioned between one of the first and second ends of the first connection portion and the first region of the first connection portion, and wherein a width of the first region is bigger than a width of the second region.

2. The lens moving apparatus according to claim 1, wherein the second elastic part comprises a second outer frame coupled to the housing, a second inner frame coupled to the bobbin, and a second connection portion connecting the second outer frame and the second inner frame, wherein the damper comprises a second damper contacted with the second connection portion.

3. The lens moving apparatus according to claim 2, wherein the second connection portion comprises a first end connected to the second outer frame and a second end connected to the second inner frame, and wherein the second damper is closer to the first end of the second connection portion than to the second end of the second connection portion.

4. The lens moving apparatus according to claim 1, wherein the first outer frame is coupled to an upper portion of the housing, and the first inner frame is coupled to an upper portion of the bobbin.

5. The lens moving apparatus according to claim 2, wherein the second outer frame comprises a second hole coupled to a second part of the housing, and the second inner frame comprises a second hole coupled to a second part of the bobbin, and wherein the second damper is closer to the second hole of the second outer frame than to the second hole of the second inner frame.

6. The lens moving apparatus according to claim 1, wherein the first damper is contacted with the housing and spaced apart from the first inner frame and the first outer frame.

7. The lens moving apparatus according to claim 1, wherein the housing comprises a first protruding part coupled to the first hole of the first outer frame of the first elastic part, and wherein the bobbin comprises a first protruding part coupled to the first hole of the inner frame of the first elastic part.

8. The lens moving apparatus according to claim 1, comprising:

a circuit board disposed on the housing;

a position sensor disposed on the circuit board and electrically connected to the circuit board; and a second magnet disposed on the bobbin to be opposite to the position sensor.

9. The lens moving apparatus according to claim 8, wherein the circuit board is electrically connected to the first and second elastic parts.

10. The lens moving apparatus according to claim 1, wherein the coil is electrically connected to the first and second elastic parts.

11. The lens moving apparatus according to claim 3, wherein the second connection portion comprises:

a third region on which the second damper is disposed; and a fourth region positioned between one of the first and second ends of the second connection portion and the third region of the second connection portion, and wherein a width of the third region is bigger than a width of the fourth region.

12. A lens moving apparatus comprising:

a housing;

a bobbin disposed in the housing;

a first magnet disposed on the housing;

a coil disposed on the bobbin;

an upper elastic member comprising a first elastic part; and a damper contacted with the upper elastic member, wherein the first elastic part comprises a first outer frame coupled to the housing, a first inner frame coupled to the bobbin, and a first connection portion connecting the first outer frame and the first inner frame, wherein the first connection portion comprises a first end connected to the first outer frame and a second end connected to the first inner frame, wherein the damper comprises a first damper contacted with the first connection portion, wherein the first outer frame comprises a first hole coupled to a first part of the housing, wherein the first inner frame comprises a first hole coupled to a first part of the bobbin, wherein the first damper is closer to the first part of the housing than to the first part of the bobbin, wherein the first connection portion comprises:

a first region on which the first damper is disposed; and a second region positioned between one of the first and second ends of the first connection portion and the first region of the first connection portion, and wherein a width of the first region is bigger than a width of the second region.

13. The lens moving apparatus according to claim 12, wherein the first outer frame is coupled to an upper portion of the housing, and the first inner frame is coupled to an upper portion of the bobbin.

14. The lens moving apparatus according to claim 12, wherein the first damper is contacted with the housing and spaced apart from the first inner frame and the first outer frame.

15. The lens moving apparatus according to claim 12, wherein the first part of the housing is a protruding part protruding from an upper surface of the housing, and wherein the first part of the bobbin is a protruding part protruding from an upper surface of the bobbin.

16. The lens moving apparatus according to claim 12, comprising:

a circuit board disposed on the housing and comprising a plurality of terminals;

a second magnet disposed on the bobbin; and a position sensor disposed on the circuit board and configured to detect the second magnet.

17. The lens moving apparatus according to claim 12, wherein the first connection portion comprises:

a first region on which the first damper is disposed; and a second region positioned between the first end of the first connection portion and the first region of the first connection portion, and wherein a width of the first region is bigger than a width of the second region.

18. The lens moving apparatus according to claim 16, wherein the bobbin comprises a recess for accommodating the second magnet, and wherein the position sensor is a Hall sensor.

19. A lens moving apparatus comprising:

a housing;

a bobbin disposed in the housing;

a first magnet disposed on the housing;

a coil disposed on the bobbin;

an elastic member comprising a first elastic part and a second elastic part;

a damper contacted with the elastic member, wherein the first elastic part comprises a first outer frame coupled to the housing, a first inner frame coupled to the bobbin, and a first connection portion connecting the first outer frame and the first inner frame, wherein the second elastic part comprises a second outer frame coupled to the housing, a second inner frame coupled to the bobbin, and a second connection portion connecting the second outer frame and the second inner frame, wherein the damper comprises a first damper contacted with the first connection portion and a second damper contacted with the second connection portion, wherein the first outer frame comprises a first hole coupled to a first part of the housing, wherein the first inner frame comprises a first hole coupled to a first part of the bobbin, wherein the second outer frame comprises a second hole coupled to a second part of the housing, wherein the second inner frame comprises a second hole coupled to a second part of the bobbin, wherein the first damper is closer to a first end of the first connection portion than to a second end of the first connection portion, wherein the first damper is closer to the first part of the housing than to the first part of the bobbin, wherein the second damper is closer to the second hole of the second outer frame than to the second hole of second the inner frame, wherein the first elastic part is separated from the second elastic part, wherein the first connection portion comprises:

a first region on which the first damper is disposed; and a second region positioned between one of the first and second ends of the first connection portion and the first region of the first connection portion, and wherein a width of the first region is bigger than a width of the second region.

* * * * *